United States Patent
Song et al.

(10) Patent No.: US 11,829,581 B2
(45) Date of Patent: Nov. 28, 2023

(54) DISPLAY CONTROL METHOD AND TERMINAL

(71) Applicant: Huawei Technologies Co., Ltd., Shenzhen (CN)

(72) Inventors: Lang Song, Shanghai (CN); Quanfei Xu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 350 days.

(21) Appl. No.: 17/057,458

(22) PCT Filed: May 21, 2018

(86) PCT No.: PCT/CN2018/087705
§ 371 (c)(1),
(2) Date: Nov. 20, 2020

(87) PCT Pub. No.: WO2019/222887
PCT Pub. Date: Nov. 28, 2019

(65) Prior Publication Data
US 2021/0149534 A1    May 20, 2021

(51) Int. Cl.
*G06F 3/048* (2013.01)
*G06F 3/0483* (2013.01)
*G06T 13/80* (2011.01)

(52) U.S. Cl.
CPC ............ *G06F 3/0483* (2013.01); *G06T 13/80* (2013.01)

(58) Field of Classification Search
CPC .... G06F 3/0483; G06F 3/0485; G06F 3/0486; G06F 3/04883; G06F 3/048; G06T 13/80
See application file for complete search history.

(56) References Cited

U.S. PATENT DOCUMENTS

| 5,463,725 A * | 10/1995 | Henckel | G06F 16/9562 715/776 |
| 7,898,541 B2 * | 3/2011 | Hong | G06T 19/00 345/473 |

(Continued)

FOREIGN PATENT DOCUMENTS

| CN | 101887647 A | 11/2010 |
| CN | 102364428 A | 2/2012 |

(Continued)

OTHER PUBLICATIONS

"Cubic-bezier," https://cubic-bezier.com/#.5,.23,.08,.93, Dec. 24, 2021, 1 page.

*Primary Examiner* — Hua Lu
(74) *Attorney, Agent, or Firm* — Conley Rose, P.C.

(57) ABSTRACT

A method includes displaying, by a terminal, a first screen on a touchscreen, receiving, by the terminal, a page flip operation from a user on the first screen, playing, by the terminal, a first page flip animation for switching from the first screen to a second screen in response to the page flip operation, where animation play parameters of the first page flip animation are related to first touch parameters generated on the touchscreen by a user finger during the page flip operation, and playing, by the terminal after the page flip operation ends, a second page flip animation for switching from the first screen to the second screen until the terminal displays the complete second screen, where animation play parameters of the second page flip animation are related to second touch parameters generated when the user finger leaves the touchscreen.

20 Claims, 15 Drawing Sheets

(56) References Cited

U.S. PATENT DOCUMENTS

| | | | | |
|---|---|---|---|---|
| 8,284,167 B2* | 10/2012 | Li | | G06F 3/04883 715/702 |
| 8,826,191 B1* | 9/2014 | Shuma | | G06F 3/04842 715/251 |
| 8,935,627 B2* | 1/2015 | Ryu | | G06F 3/0483 715/776 |
| 8,990,719 B2* | 3/2015 | Matas | | G06F 3/04817 715/765 |
| 9,760,179 B2* | 9/2017 | Petschnigg | | G06F 3/04883 |
| 9,830,049 B2* | 11/2017 | Martin | | G06F 3/0485 |
| 10,908,868 B2* | 2/2021 | Lan | | G06F 3/04883 |
| 2002/0113823 A1* | 8/2002 | Card | | G06F 3/04815 715/776 |
| 2003/0020687 A1* | 1/2003 | Sowden | | G06F 3/03547 345/157 |
| 2006/0133664 A1* | 6/2006 | Hong | | G06T 13/20 382/154 |
| 2009/0271731 A1* | 10/2009 | Lin | | G06F 3/04883 715/776 |
| 2009/0271783 A1* | 10/2009 | Hsieh | | G06F 3/04883 715/776 |
| 2010/0045616 A1* | 2/2010 | Li | | G06F 3/04883 715/702 |
| 2011/0209099 A1* | 8/2011 | Hinckley | | G06F 3/04883 715/863 |
| 2012/0044266 A1* | 2/2012 | Mori | | G09G 5/34 345/672 |
| 2012/0105464 A1* | 5/2012 | Franceus | | G06T 13/20 345/581 |
| 2012/0162213 A1* | 6/2012 | Shim | | G06F 3/04815 345/419 |
| 2012/0182310 A1* | 7/2012 | Okada | | G06F 3/0483 345/619 |
| 2012/0311438 A1* | 12/2012 | Cranfill | | G06F 3/0483 715/256 |
| 2013/0076758 A1* | 3/2013 | Li | | G06F 3/0488 345/473 |
| 2013/0111334 A1 | 5/2013 | Liang et al. | | |
| 2013/0111395 A1* | 5/2013 | Ying | | G06F 3/0483 715/783 |
| 2013/0135215 A1* | 5/2013 | Bozarth | | G06F 3/147 345/173 |
| 2013/0147825 A1* | 6/2013 | Martin | | G06F 3/04883 345/589 |
| 2013/0179800 A1* | 7/2013 | Jeong | | H04L 51/216 715/752 |
| 2013/0198678 A1* | 8/2013 | Lee | | G06F 3/0488 715/776 |
| 2013/0219321 A1* | 8/2013 | Cranfill | | G06F 3/0488 715/776 |
| 2013/0229371 A1* | 9/2013 | Lee | | G06F 3/04883 345/173 |
| 2013/0268851 A1* | 10/2013 | Joo | | G06F 40/166 715/255 |
| 2013/0268858 A1* | 10/2013 | Kim | | G06F 3/0483 715/716 |
| 2013/0298069 A1* | 11/2013 | Petschnigg | | G06F 3/0483 715/776 |
| 2014/0013267 A1* | 1/2014 | Stepanov | | G06F 3/0483 715/776 |
| 2014/0028701 A1* | 1/2014 | Eriksson | | G06F 3/0483 345/619 |
| 2014/0075286 A1* | 3/2014 | Harada | | G06F 40/103 715/234 |
| 2014/0096082 A1* | 4/2014 | Zhen | | G06F 3/0485 715/830 |
| 2014/0215411 A1* | 7/2014 | Kong | | G06F 3/017 715/863 |
| 2014/0347369 A1* | 11/2014 | Korba | | G06F 3/0483 345/473 |
| 2014/0380247 A1* | 12/2014 | Tecarro | | G06F 3/0483 715/863 |
| 2015/0067582 A1* | 3/2015 | Donnelly | | G06F 3/0481 715/800 |
| 2016/0210004 A1* | 7/2016 | Shinohara | | G06F 3/0483 |
| 2017/0220216 A1* | 8/2017 | Thompson | | G06F 3/0483 |
| 2018/0059891 A1* | 3/2018 | Martin | | G06F 3/0485 |
| 2019/0102053 A1* | 4/2019 | Ishida | | G06T 13/80 |
| 2020/0019366 A1* | 1/2020 | Lan | | G06F 3/0482 |
| 2021/0109699 A1* | 4/2021 | Lan | | G06F 1/1647 |

FOREIGN PATENT DOCUMENTS

| | | | |
|---|---|---|---|
| CN | 102385473 | A | 3/2012 |
| CN | 102402392 | A * | 4/2012 |
| CN | 103530030 | A | 1/2014 |
| CN | 103645844 | A | 3/2014 |
| CN | 103853439 | A * | 6/2014 |
| CN | 104081326 | A | 10/2014 |
| CN | 104375702 | A | 2/2015 |
| CN | 104536650 | A | 4/2015 |
| CN | 106709070 | A | 5/2017 |
| CN | 109508132 | A * | 3/2019 |
| JP | 2001229398 | A | 8/2001 |
| JP | 2010250757 | A * | 11/2010 |
| KR | 20100090876 | A | 8/2010 |
| WO | 0221307 | A2 | 3/2002 |

* cited by examiner

CONT. FROM FIG. 1B

TO FIG. 1D

A finger leaves

CONT. FROM FIG. 1C  —  Hand-leaving phase  —  TO FIG. 1E

CONT.
FROM

A swipe distance (s) triggers a second page flip animation:
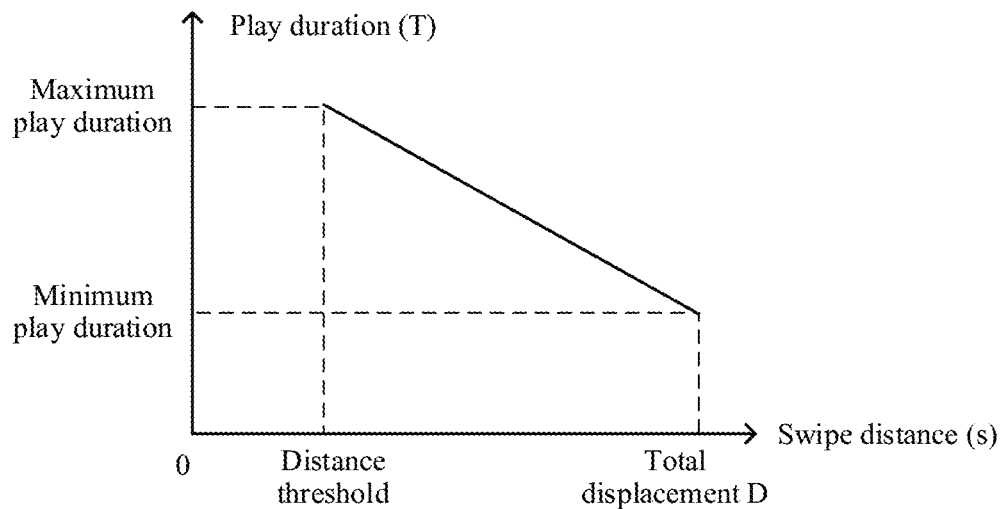
FIG. 8
A swipe speed (v2) triggers a second page flip animation:
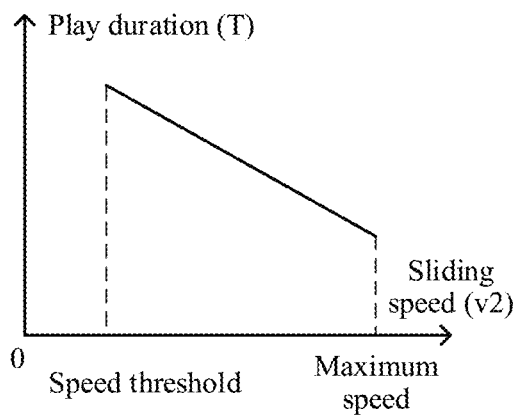 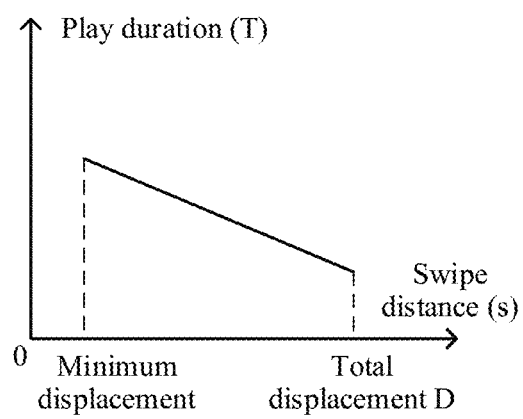
FIG. 9(a)　　　　　　　　FIG. 9(b)

A swipe speed (v2) triggers a second page flip animation:

DISPLAY CONTROL METHOD AND TERMINAL

CROSS-REFERENCE TO RELATED APPLICATIONS

This application is a U.S. National Stage of International Patent Application No. PCT/CN2018/087705 filed on May 21, 2018, which is hereby incorporated by reference in its entirety.

TECHNICAL FIELD

This application relates to the terminal field, and in particular, to a display control method and a terminal.

BACKGROUND

In order that a user obtains better human-machine interaction experience when using a terminal such as a mobile phone, an animation effect is added on many terminals during display. A page flip animation is used as an example. As shown in FIG. 1A to FIG. 1E, when a user's finger swipes on a touchscreen to flip pages, a currently displayed page 1 may be flipped following the user's finger, and a next page (namely, a page 2) of the page 1 is gradually exposed. After the user's finger leaves the touchscreen, the terminal still displays, on the touchscreen, a continuous flip animation effect of the page 1, until the terminal displays the complete page 2 on the touchscreen.

However, currently, both play duration and an animation change speed during play of the page flip animation are fixed values. In other words, regardless of whether the user swipes relatively fast or relatively slowly on the touchscreen, a same page flip animation effect is displayed. Consequently, play of the page flip animation cannot adapt to an environment change, and adaptive adjustment cannot be performed in response to different user operations.

SUMMARY

This application provides a display control method and a terminal, to improve environment adaptability of an animation during display of a page flip animation.

To achieve the foregoing objectives, the following technical solutions are used in this application.

According to a first aspect, this application provides a display control method, including: displaying, by a terminal, a first screen on a touchscreen; receiving, by the terminal, a page flip operation performed by a user on the first screen; in response to the page flip operation, playing, by the terminal, a first page flip animation for switching from the first screen to a second screen, where animation play parameters of the first page flip animation are related to first touch parameters generated by the user's finger on the touchscreen during the page flip operation; and playing, by the terminal after the page flip operation ends, a second page flip animation for switching from the first screen to the second screen until the terminal displays the complete second screen, where animation play parameters of the second page flip animation are related to second touch parameters generated when the user's finger leaves the touchscreen.

In other words, the terminal may dynamically change, based on actual touch parameters generated when the user's finger leaves the touchscreen, animation play parameters that can affect a page flip animation effect of the second page flip animation, so that the user can obtain, in various page flip scenarios, a page flip animation effect consistent with an actual touch scenario, to improve smoothness of a page flip animation and environment adaptability.

In a possible design method, the playing, by the terminal after the page flip operation ends, a second page flip animation for switching from the first screen to the second screen includes: when the page flip operation ends, obtaining, by the terminal, the second touch parameters, where the second touch parameters include a swipe distance and a swipe speed that are generated when the user's finger leaves the touchscreen; determining, by the terminal, the animation play parameters of the second page flip animation based on the second touch parameters, where the animation play parameters of the second page flip animation include play duration and a page flip speed of the second page flip animation; and playing, by the terminal based on the animation play parameters of the second page flip animation, the second page flip animation for switching from the first screen to the second screen. That is, the terminal may determine the animation play parameters of the second page flip animation based on actual touch parameters such as a speed and a displacement that are generated when the user's finger leaves the touchscreen, and then play the second page flip animation based on the animation play parameters, to present a page flip animation effect consistent with an actual touch scenario to the user.

In a possible design method, the determining, by the terminal, the animation play parameters of the second page flip animation based on the second touch parameters includes: when the swipe distance in the second touch parameters is greater than a preset distance threshold, determining, by the terminal, the animation play parameters of the second page flip animation based on a first preset relationship; or when the swipe speed in the second touch parameters is greater than a preset speed threshold, determining, by the terminal, the animation play parameters of the second page flip animation based on a second preset relationship. In other words, in this application, different animation play parameter calculation methods are set for a page flip scenario in which the user quickly swipes on the first screen to trigger a page flip animation and a page flip scenario in which the user slowly swipes on the first screen to trigger a page flip animation, so that the user can obtain matching second page flip animation effects in both the low-speed page flip scenario and the high-speed page flip scenario.

In a possible design method, the determining, by the terminal, the animation play parameters of the second page flip animation based on a first preset relationship includes: calculating, by the terminal, the play duration of the second page flip animation based on a first function relationship, where in the first function relationship, the play duration of the second page flip animation is inversely proportional to the swipe distance in the second touch parameters; and setting, by the terminal, coordinates of a control point on a Bézier curve to a preset value, where the coordinates of the control point are used to determine the page flip speed of the second page flip animation.

For example, if the distance threshold is x % of a total displacement D of the page flip animations, the first function relationship is $T=k1+(1-c)/(1-x\%) \times k2$, where T is the play duration of the second page flip animation; c is a displacement completion rate generated when the user's finger leaves the touchscreen, and c=swipe distance in the second touch parameters/total displacement D; and k1 and k2 are preset constant values, $0<k1<1$, and $021\ k2<1$; and x is a natural number.

In a possible design method, the determining, by the terminal, the animation play parameters of the second page flip animation based on a second preset relationship includes: calculating, by the terminal, the play duration of the second page flip animation based on a second function relationship, where in the second function relationship, the play duration of the second page flip animation is inversely proportional to both the swipe distance and the swipe speed in the second touch parameters.

For example, if the speed threshold is w4, and a maximum swipe speed generated when the user's finger leaves the touchscreen is w5, the second function relationship is:

$$T = w1 + w2x(1-c) + w3x\left(1 - \frac{v2-w4}{w5-w4}\right),$$

where

T is the play duration of the second page flip animation; v2 is the swipe speed in the second touch parameters; c is a displacement completion rate generated when the user's finger leaves the touchscreen, and c=swipe distance in the second touch parameters/total displacement D of the page flip animations; and w1, w2, and w3 are preset constant values, 0<w1<1, 0<w2<1, and 0<w3<1.

In a possible design method, the page flip speed of the second page flip animation is determined based on coordinates of a control point on a Bézier curve, and the determining, by the terminal, the animation play parameters of the second page flip animation based on a second preset relationship includes: calculating, by the terminal, a horizontal coordinate of the control point based on a third function relationship, where the horizontal coordinate of the control point is used to determine a location of a speed peak during play of the second page flip animation; and calculating, by the terminal, a vertical coordinate of the control point based on a fourth function relationship, where the vertical coordinate of the control point is used to determine an initial speed during play of the second page flip animation.

For example, if the speed threshold is w4, a maximum swipe speed generated when the user's finger leaves the touchscreen is w5, the play duration of the second page flip animation is T, and a total displacement of the page flip animations is D, the third function relationship is $$a = n1 \times \left(1 - \frac{v2-w4}{w5-w4}\right);$$

and the fourth function relationship is $$b = \frac{v2 \times a \times T}{2 \times (1-c) \times D},$$

where a is the horizontal coordinate of the control point, and b is the vertical coordinate of the control point; v2 is the swipe speed in the second touch parameters; c is a displacement completion rate generated when the user's finger leaves the touchscreen, and c=swipe distance in the second touch parameters/total displacement D; and n1 is a preset constant value, and 021 n1<1.

In a possible design method, play duration of the first page flip animation is equal to touch duration of the user's finger on the touchscreen, and a page flip speed of the first page flip animation is equal to a swipe speed of the user's finger on the touchscreen.

According to a second aspect, this application provides a terminal, including: a display unit, configured to display a first screen; an obtaining unit, configured to receive a page flip operation performed by a user on the first screen; and an animation play unit, configured to: in response to the page flip operation, play a first page flip animation for switching from the first screen to a second screen, where animation play parameters of the first page flip animation are related to first touch parameters generated by the user's finger on a touchscreen during the page flip operation; and after the page flip operation ends, play a second page flip animation for switching from the first screen to the second screen until the display unit displays the complete second screen, where animation play parameters of the second page flip animation are related to second touch parameters generated when the user's finger leaves the touchscreen.

In a possible design method, the terminal further includes a determining unit, the obtaining unit is further configured to obtain the second touch parameters, where the second touch parameters include a swipe distance and a swipe speed generated when the user's finger leaves the touchscreen; the determining unit is configured to determine the animation play parameters of the second page flip animation based on the second touch parameters, where the animation play parameters of the second page flip animation include play duration and a page flip speed of the second page flip animation; and the animation play unit is specifically configured to play, based on the animation play parameters of the second page flip animation, the second page flip animation for switching from the first screen to the second screen.

In a possible design method, the determining unit is specifically configured to: when the swipe distance in the second touch parameters is greater than a preset distance threshold, determine the animation play parameters of the second page flip animation based on a first preset relationship; or when the swipe speed in the second touch parameters is greater than a preset speed threshold, determine the animation play parameter of the second page flip animation based on a second preset relationship.

In a possible design method, the determining unit is specifically configured to: calculate the play duration of the second page flip animation based on a first function relationship, where in the first function relationship, the play duration of the second page flip animation is inversely proportional to the swipe distance in the second touch parameters; and set coordinates of a control point on a Bézier curve to a preset value, where the coordinates of the control point are used to determine the page flip speed of the second page flip animation.

For example, if the distance threshold is x % of a total displacement D of the page flip animations, the first function relationship is T=k1+(1−c)/(1−x %)×k2, where T is the play duration of the second page flip animation; c is a displacement completion rate generated when the user's finger leaves the touchscreen, and c=swipe distance in the second touch parameters/total displacement D; and k1 and k2 are preset constant values, 0<k1<1, and 021 k2<1.

In a possible design method, the determining unit is specifically configured to calculate the play duration of the second page flip animation based on a second function relationship, where in the second function relationship, the play duration of the second page flip animation is inversely proportional to both the swipe distance and the swipe speed in the second touch parameters.

For example, if the speed threshold is w4, and a maximum swipe speed generated when the user's finger leaves the touchscreen is w5, the second function relationship is:

$$T = w1 + w2x(1-c) + w3x\left(1 - \frac{v2-w4}{w5-w4}\right),$$

where

T is the play duration of the second page flip animation; v2 is the swipe speed in the second touch parameters; c is a displacement completion rate generated when the user's finger leaves the touchscreen, and c=swipe distance in the second touch parameters/total displacement D of the page flip animations; and w1, w2, and w3 are preset constant values, 0<w1<1, 0<w2<1, and 0<w3<1.

In a possible design method, the page flip speed of the second page flip animation is determined based on coordinates of a control point on a Bézier curve, and the determining unit is specifically configured to: calculate a horizontal coordinate of the control point based on a third function relationship, where the horizontal coordinate of the control point is used to determine a location of a speed peak during play of the second page flip animation; and calculate a vertical coordinate of the control point based on a fourth function relationship, where the vertical coordinate of the control point is used to determine an initial speed during play of the second page flip animation.

For example, if the speed threshold is w4, a maximum swipe speed generated when the user's finger leaves the touchscreen is w5, the play duration of the second page flip animation is T, and a total displacement of the page flip animations is D, the third function relationship is $$a = n1 \times \left(1 - \frac{v2-w4}{w5-w4}\right);$$

and the fourth function relationship is $$b = \frac{v2 \times a \times T}{2 \times (1-c) \times D},$$

where a is the horizontal coordinate of the control point, and b is the vertical coordinate of the control point; v2 is the swipe speed in the second touch parameters; c is a displacement completion rate generated when the user's finger leaves the touchscreen, and c=swipe distance in the second touch parameters/total displacement D; and n1 is a preset constant value, and 021 n1<1.

In a possible design method, play duration of the first page flip animation is equal to touch duration of the user's finger on the touchscreen, and a page flip speed of the first page flip animation is equal to a swipe speed of the user's finger on the touchscreen.

According to a third aspect, this application provides a terminal, including a touchscreen, one or more processors, a memory, a plurality of application programs, and one or more programs. The processor is coupled to the memory, and the one or more programs are stored in the memory. When the terminal runs, the processor executes the one or more programs stored in the memory, so that the terminal performs the display control method according to any design method.

According to a fourth aspect, this application provides a computer storage medium, including a computer instruction. When the computer instruction is run on a terminal, the terminal is enabled to perform the display control method according to any design method of the first aspect.

According to a fifth aspect, this application provides a computer program product. When the computer program product is run on a computer, the computer is enabled to perform the display control method according to any design method of the first aspect.

It may be understood that, the terminals in the second aspect and the third aspect, the computer storage medium in the fourth aspect, and the computer program product in the fifth aspect that are provided above are all configured to perform the corresponding methods provided above. Therefore, for beneficial effects that can be achieved by the terminal, the computer storage medium, and the computer program product, refer to beneficial effects in the corresponding methods provided above. Details are not described again herein.

BRIEF DESCRIPTION OF DRAWINGS

FIG. 8 is a schematic principle diagram 1 of a display control method according to an embodiment of this application;

FIG. 9(a) and FIG. 9(b) are a schematic principle diagram 2 of a display control method according to an embodiment of this application;

DESCRIPTION OF EMBODIMENTS

To facilitate clear understanding of the following embodiments, related technical terms are first described briefly.

Still as shown in FIG. 1A to FIG. 1E, a page flip animation includes a "hand-touching phase" in which a finger of a user touches a touchscreen, and a "hand-leaving phase" after the user's finger leaves the touchscreen. Generally, there are two parameters that affect a page flip animation effect in the "hand-leaving phase": animation play duration and an animation change speed. For example, an interpolator (Interpolator) may control an animation to change at various speeds, such as a uniform speed, an accelerated speed, a decelerated speed, or a parabolic speed.

The interpolator is generally a component used to control an animation change speed in an operating system of a terminal, and can enable a basic animation effect to change at various speeds such as a uniform speed, an accelerated speed, a decelerated speed, and a parabolic speed.

Each frame of the animation is displayed at a specific time between a start time and an end time of the animation. In this case, an entire play process of the animation may be decomposed into a plurality of floating point numbers from 0 to 1 on a time axis. Further, a play speed of an animation element for each floating point number may be calculated, to control a running progress of the entire animation.

An interpolator based on a Bézier curve is used as an example. The Bézier curve (Bézier curve) is alternatively referred to as a Bézier curve or a Bézier curve, and is a mathematical curve applied to a two-dimensional graphics application program. The Bézier curve consists of line segments and points. The points are control points that can be dragged. The line segments are like retractable elastic cords. There are four points (P0 to P3) on the Bézier curve shown in FIG. 2. P0 (0, 0) and P3 (1, 1) are a default start point and a default end point of an animation, and P1 and P2 are control points (curve point) of the Bézier curve. A shape of the Bézier curve can be changed by changing positions of P1 and P2.

Figure 1A:
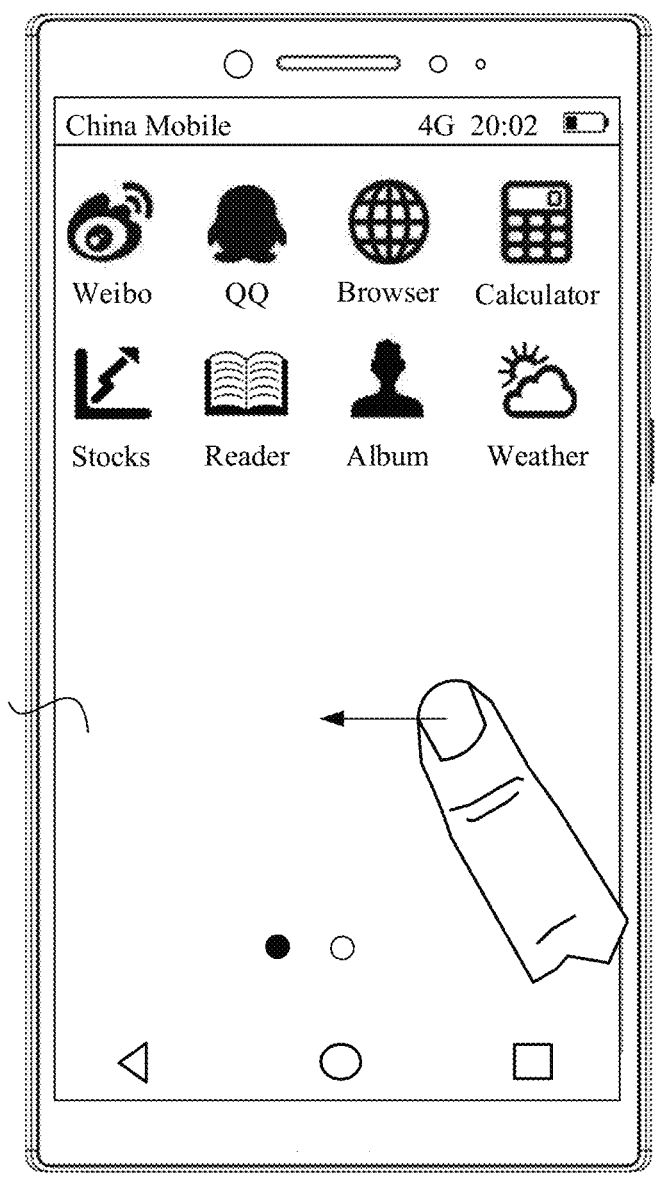
FIG. 1A to FIG. 1E are a schematic diagram of an application scenario of a page flip animation in the prior art.
Figure 1B:
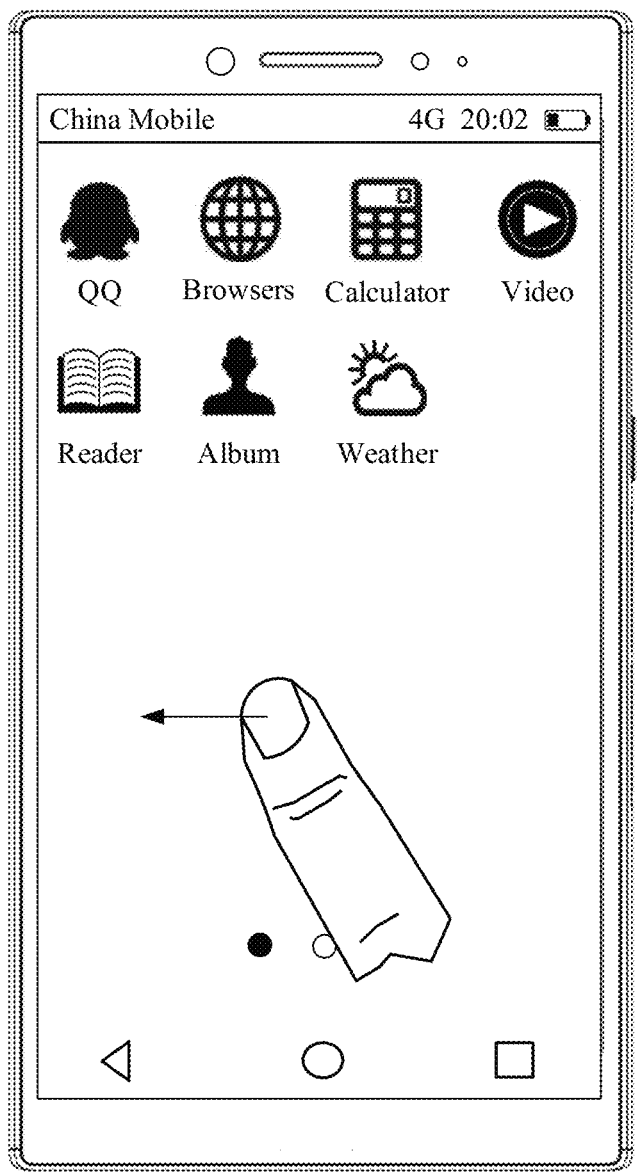
Figure 1C:
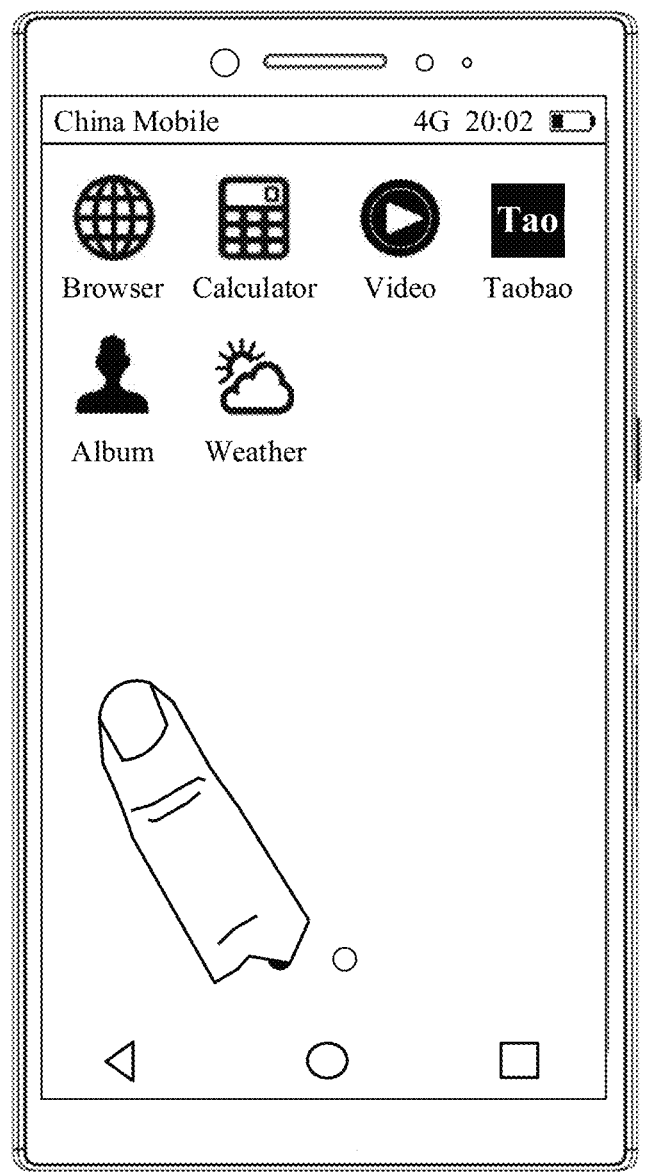
Figure 1D:
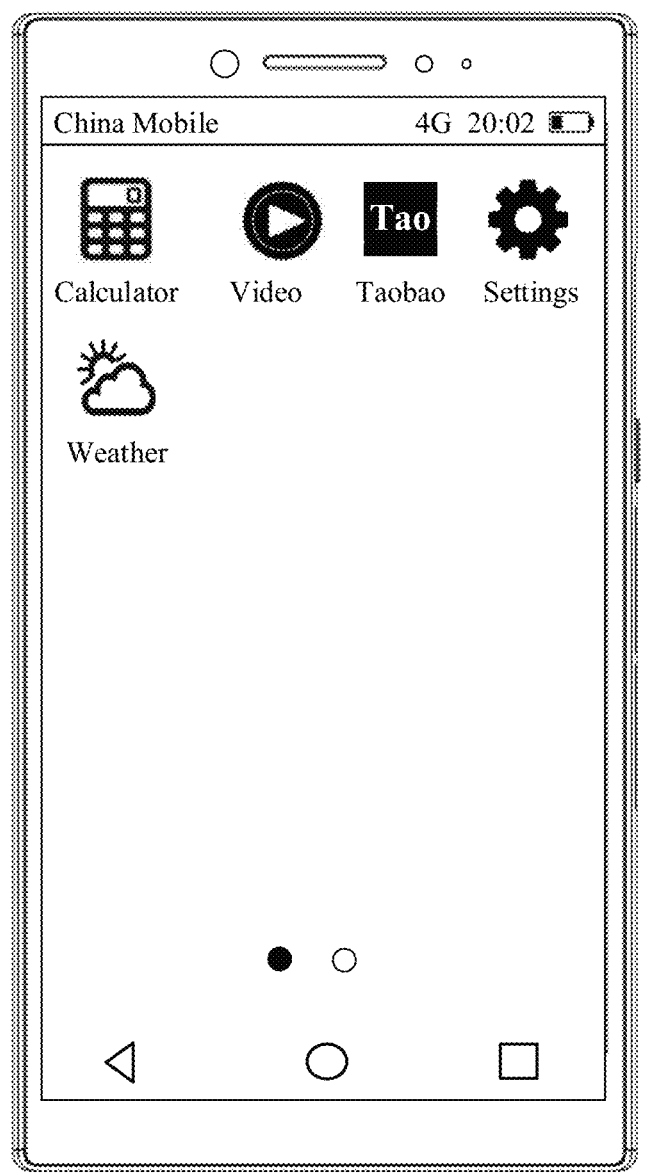
Figure 1E:
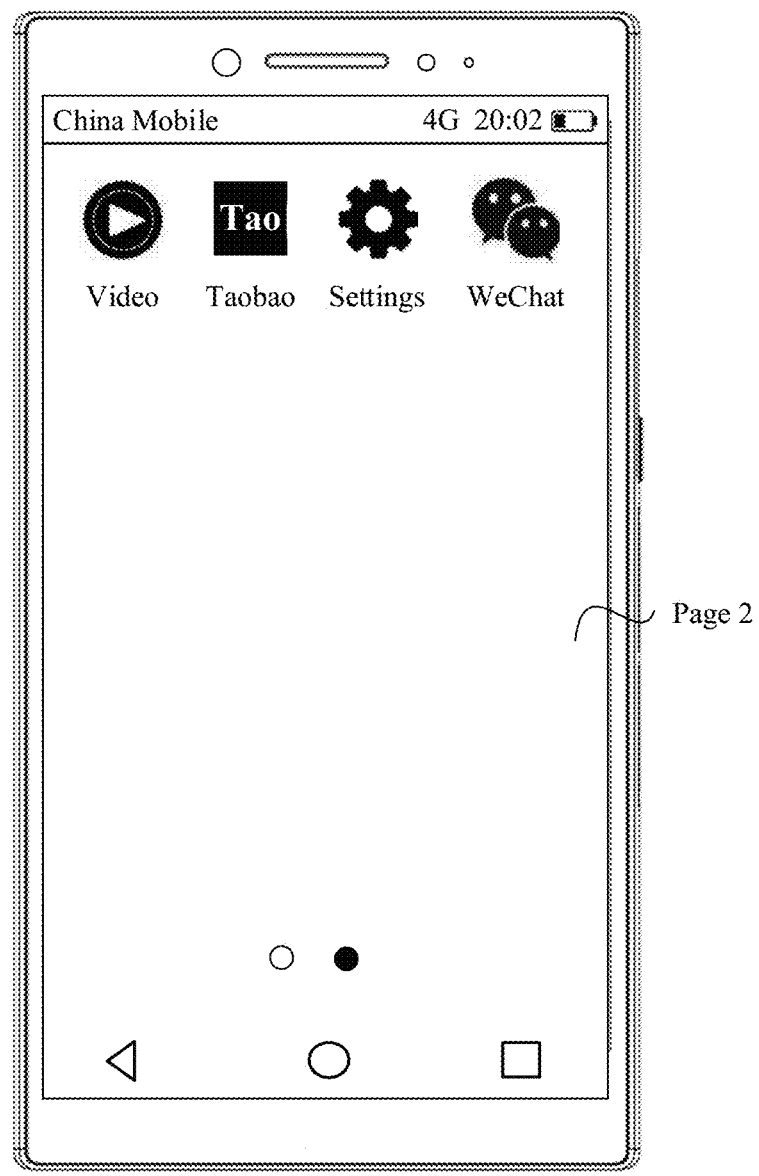
Figure 2:
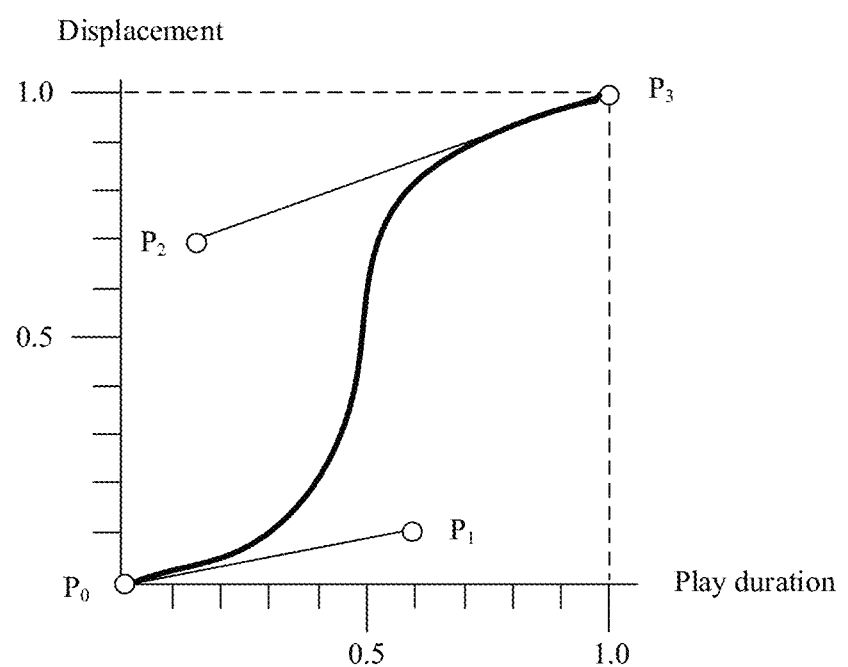
FIG. 2 is a schematic diagram of a Bézier curve.

When the shape of the Bézier curve changes, a rhythm during animation display changes accordingly. For example, still as shown in FIG. 2, a horizontal axis of the Bézier curve may be used to indicate play duration of the entire animation, and a vertical axis of the Bézier curve may be used to indicate a displacement of an animation element in the animation. A slope of each point on the Bézier curve can represent an animation play speed at a corresponding time and at a corresponding displacement. When the shape of the Bézier curve changes, a slope of a corresponding point on the Bézier curve also changes. Therefore, the rhythm during the animation display can be adjusted by changing the positions of P1 and P2.

For example, a page flip animation is displayed. If the terminal sets the foregoing points P1 and P2 to fixed values, during display of the page flip animation, the terminal displays an entire page flip process each time based on a rate distribution status on the Bézier curve shown in FIG. 2. Because slopes of the first half part of the Bézier curve shown in FIG. 2 increase, and slopes of the second half part of the Bézier curve gradually decreases, the entire page flip animation also presents a display effect of acceleration before deceleration. However, if a speed at which the user's finger leaves the touchscreen is greatly different from an initial speed of the page flip animation in the "hand-leaving phase", the user may feel unsmooth and unnaturalness such as speed unsteadiness during play of the page flip animation.

In this case, according to a display control method provided in the embodiments of this application, animation play parameters such as an interpolator parameter (for example, coordinates of P1 and P2) and animation duration that can affect a page flip animation effect can be dynamically changed based on actual touch parameters such as a speed and a displacement generated when the user's finger leaves the touchscreen. In this way, the user can obtain a page flip animation effect consistent with an actual touch scenario in various page flip scenarios, to improve smoothness of the page flip animation.

The following describes the implementations of the embodiments of this application in detail with reference to accompanying drawings.

It should be noted that a display control method provided in the embodiments of this application may be applied to a terminal. For example, the terminal may be a device such as a tablet computer, a desktop computer, a laptop computer, a notebook computer, an ultra-mobile personal computer (ultra-mobile personal computer, UMPC), a handheld computer, a netbook, a personal digital assistant (personal digital assistant, PDA), a wearable electronic device, or a smart watch, or may be a mobile phone 100 shown in FIG. 3. A specific form of the terminal is not specially limited in the embodiments of this application.

Figure 3:
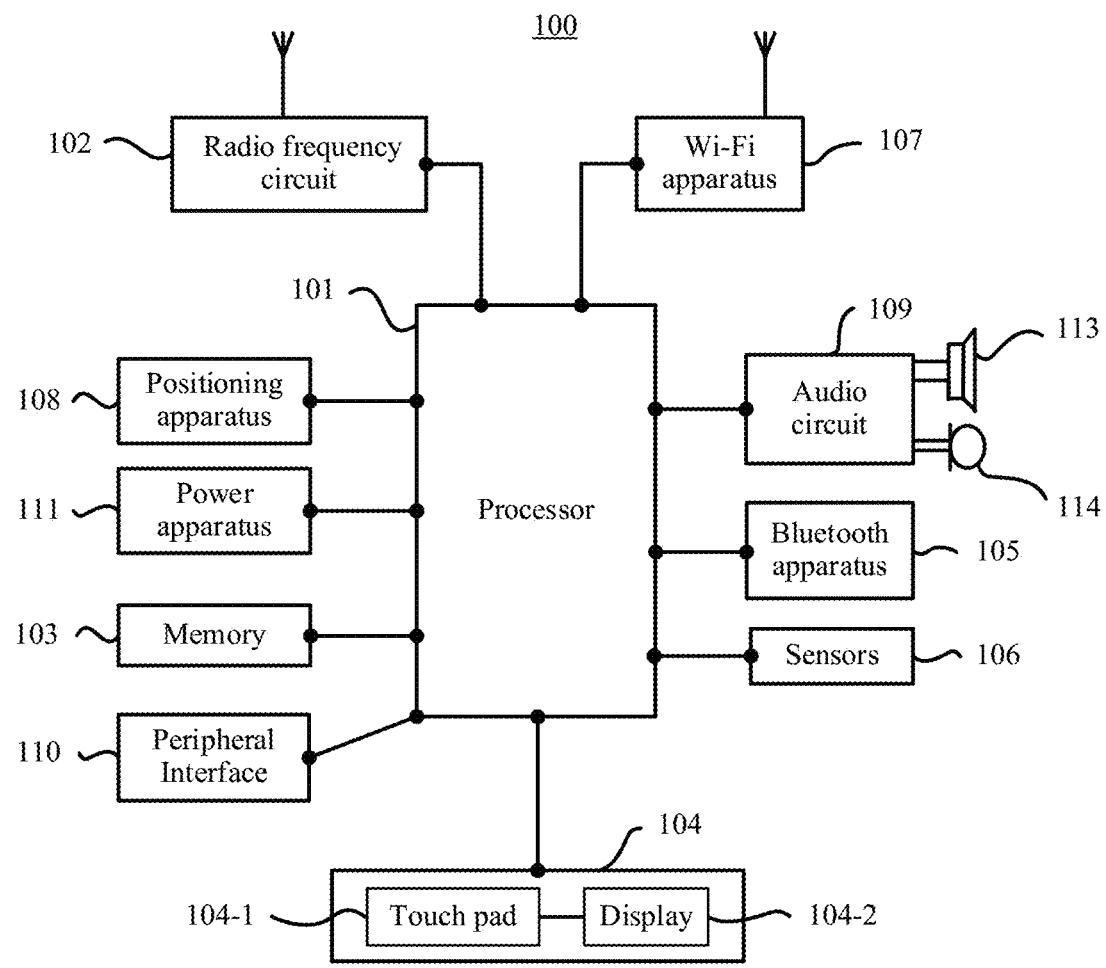
FIG. 3 is a schematic structural diagram of a terminal according to an embodiment of this application.

As shown in FIG. 3, the terminal in the embodiments of this application may be the mobile phone 100. The mobile phone 100 is used as an example below to describe the embodiments in detail. It should be understood that the mobile phone 100 shown in the figure is merely an example of the terminal, and the mobile phone 100 may have more or fewer components than those shown in the figure, or two or more components may be combined, or different component configurations may be used. Various components shown in the figure may be implemented on hardware, software, or a combination of hardware and software that includes one or more signal processing or application-specific integrated circuits.

As shown in FIG. 3, the mobile phone 100 may specifically include components such as a processor 101, a radio frequency (radio frequency, RF) circuit 102, a memory 103, a touchscreen 104, a Bluetooth apparatus 105, one or more sensors 106, a Wi-Fi apparatus 107, a positioning apparatus 108, an audio circuit 109, a peripheral interface 110, and a power apparatus 111. These components may perform communication by using one or more communications buses or signal cables (not shown in FIG. 3). A person skilled in the art may understand that a hardware structure shown in FIG. 3 does not constitute a limitation on the mobile phone 100, and the mobile phone 100 may include more or fewer components than those shown in the figure, or some components may be combined, or different component configurations may be used.

The following describes the components of the mobile phone 100 in detail with reference to FIG. 3.

The processor 101 is a control center of the mobile phone 100. The processor 101 is connected to parts of the mobile phone 100 by using various interfaces and cables, runs or executes an application program stored in the memory 103, and invokes data and an instruction stored in the memory 103, to perform various functions of the mobile phone 100 and process data. In some embodiments, the processor 101 may include one or more processing units. The processor 101 may further integrate an application processor and a modem processor. The application processor mainly processes an operating system, a user interface, an application program, and the like. The modem processor mainly processes wireless communication. It may be understood that the modem processor may alternatively not be integrated into the processor 101. For example, the processor 101 may be a Kirin 960 multi-core processor manufactured by Huawei Technologies Co., Ltd.

The radio frequency circuit 102 may be configured to send and receive a radio signal in an information receiving and sending process or a call process. Specifically, after receiving downlink data from a base station, the radio frequency circuit 102 may send the downlink data to the processor 101 for processing, and send related uplink data to the base station. Generally, the radio frequency circuit includes but is not limited to an antenna, at least one amplifier, a transceiver, a coupler, a low noise amplifier, a duplexer, and the like. In addition, the radio frequency circuit 102 may further communicate with another device through wireless communication. In the wireless communication, any communications standard or protocol may be used, including but not limited to a global system for mobile communications, a general packet radio service, code division multiple access, wideband code division multiple access, long term evolution, an email, a short message service, and the like.

The memory 103 is configured to store the application program and the data. The processor 101 runs the application program and the data that are stored in the memory 103, to perform various functions of the mobile phone 100 and process data. The memory 103 mainly includes a program storage area and a data storage area. The program storage area may store an operating system, and an application program required by at least one function (for example, a sound playing function or an image playing function). The data storage area may store data (for example, audio data or a phonebook) created based on use of the mobile phone 100. In addition, the memory 103 may include a high-speed random access memory, or may include a nonvolatile memory such as a magnetic disk storage device, a flash memory device, or another volatile solid-state storage device. The memory 103 may store various operating systems such as an iOS® operating system developed by Apple and an Android® operating system developed by Google.

The touchscreen 104 may include a touch-sensitive surface 104-1 and a display 104-2.

The touch-sensitive surface 104-1 (for example, a touch panel) may collect a touch event performed by a user of the mobile phone 100 on or near the touch-sensitive surface 104-1 (for example, an operation performed by the user on the touch-sensitive surface 104-1 or near the touch-sensitive surface 104-1 by using any proper object such as a finger or a stylus), and send collected touch information to another component, for example, the processor 101. The touch event performed by the user near the touch-sensitive surface 104-1 may be referred to as a floating touch. The floating touch may mean that the user does not need to directly touch the touchpad for selecting, moving, or dragging an object (for example, an icon), but the user needs only to be near the terminal to perform a desired function. In an application scenario of the floating touch, terms such as "touch" and "contact" do not implicitly mean to directly touch the touchscreen, but to be near or close to the touchscreen. The touch-sensitive surface 104-1 on which the floating touch can be performed may be implemented by using a capacitive type, an infrared light sensing type, an ultrasonic wave type, or the like. The touch-sensitive surface 104-1 may include two parts: a touch detection apparatus and a touch controller. The touch detection apparatus detects a touch orientation of the user, detects a signal brought by a touch operation, and transmits the signal to the touch controller. The touch controller receives touch information from the touch detection apparatus, converts the touch information into coordinates of a touch point, and sends the coordinates of the touch point to the processor 101. The touch controller may further receive and execute an instruction sent by the processor 101. In addition, the touch-sensitive surface 104-1 may be implemented in a plurality of types, such as a resistive type, a capacitive type, an infrared type, and a surface acoustic wave type.

The display 104-2 may be configured to display information entered by the user or information provided for the user, and various menus of the mobile phone 100. The display 104-2 may be configured in a form such as a liquid crystal display or an organic light-emitting diode. The touch-sensitive surface 104-1 may cover the display 104-2. After detecting a touch event on or near the touch-sensitive surface 104-1, the touch-sensitive surface 104-1 transmits the touch event to the processor 101 to determine a type of the touch event. Then, the processor 101 may provide a corresponding visual output on the display 104-2 based on the type of the touch event. Although in FIG. 3, the touch-sensitive surface 104-1 and the display 104-2 are used as two independent components to implement input and output functions of the mobile phone 100, in some embodiments, the touch-sensitive surface 104-1 and the display 104-2 may be integrated to implement the input and output functions of the mobile phone 100. It can be understood that the touchscreen 104 is formed by stacking a plurality of layers of materials. Only the touch-sensitive surface (layer) and the display (layer) are presented in the embodiments of this application, and other layers are not recorded in the embodiments of this application. In addition, in some other embodiments of this application, the touch-sensitive surface 104-1 may cover the display 104-2, and a size of the touch-sensitive surface 104-1 is greater than a size of the display 104-2. Therefore, the display 104-2 is entirely covered by the touch-sensitive surface 104-1. Alternatively, the touch-sensitive surface 104-1 may be configured on the front of the mobile phone 100 in a full panel form, in other words, any touch performed by the user on the front of the mobile phone 100 can be sensed by the mobile phone. In this way, full touch control experience on the front of the mobile phone can be implemented. In some other embodiments, the touch-sensitive surface 104-1 is configured on the front of the mobile phone 100 in the full panel form, and the display 104-2 may also be configured on the front of the mobile phone 100 in the full panel form. In this way, a bezel-less structure can be implemented on the front of the mobile phone. In some other embodiments of this application, the touchscreen 104 may further include one or more groups of sensor arrays, so that the touchscreen 104 may also sense pressure applied by the user on the touchscreen 104 while sensing a touch event performed by the user on the touchscreen 104.

In the embodiments of this application, when the touchscreen 104 detects that the user performs a page flip operation (for example, a swipe operation), the touchscreen 104 may continuously collect a touch event (for example, coordinates of a touch point, a touch moment, and the like) generated by the user's finger on the touchscreen 104. When it is detected that the user's finger leaves the touchscreen 104, the touchscreen 104 may send a touch event within a recent time period (for example, 100 ms) to the processor 101, and the processor 101 calculates actual touch parameters such as a speed at which the user's finger leaves the touchscreen 104 and a displacement generated on the touchscreen 104 when the user's finger leaves the touchscreen 104.

Further, the processor 101 may determine, based on these actual touch parameters, animation play parameters such as play duration of a page flip animation, coordinates of control points (for example, P1 and P2) that form the Bézier curve in the interpolator, and the like during play of the page flip animation. In this way, the processor 101 may play the page flip animation on the touchscreen 104 based on the determined animation play parameters, and present, to the user, a page flip animation effect that matches an actual touch scenario, to improve smoothness of the page flip animation.

Figures 4A, 4B, 4C:
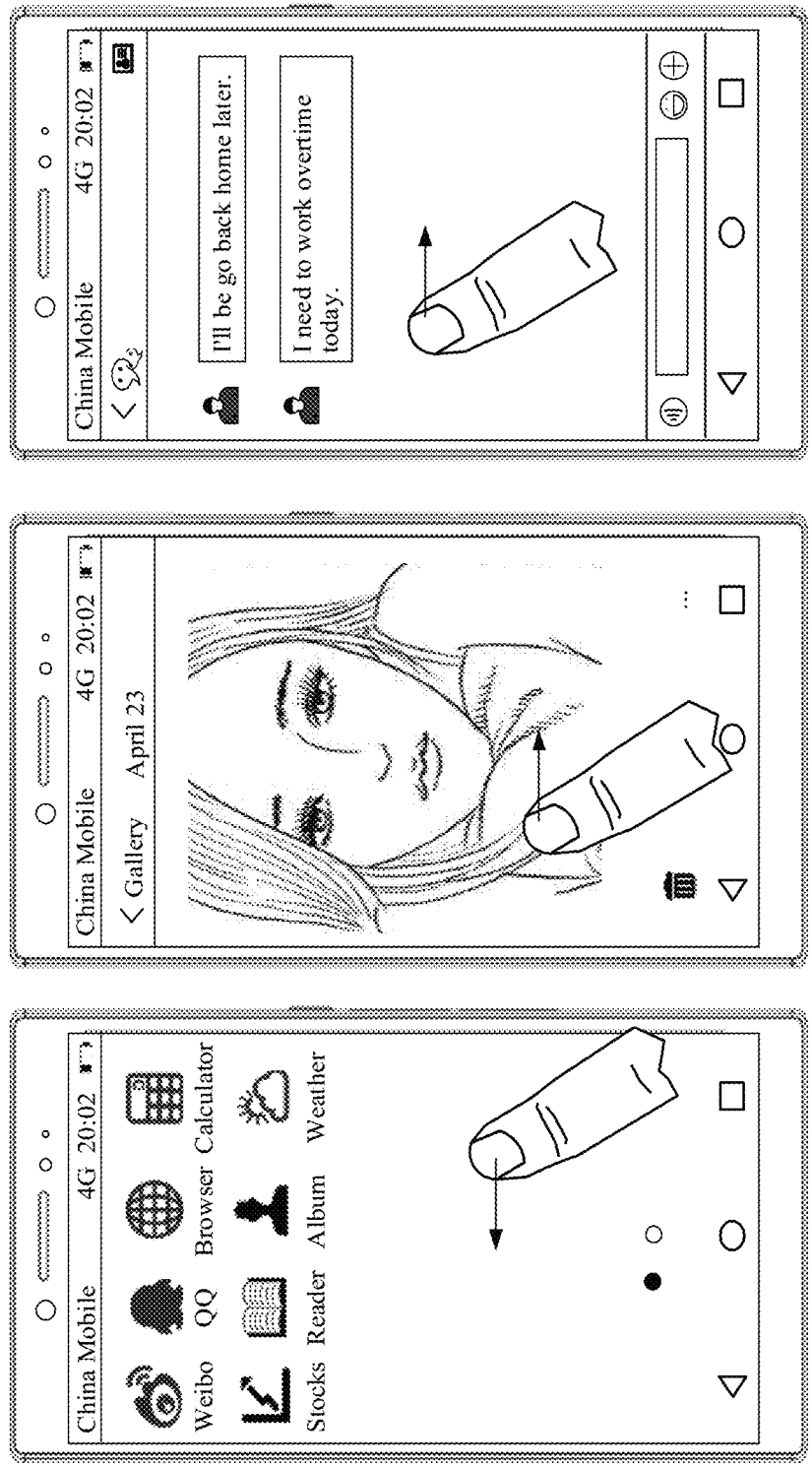
FIG. 4A to FIG. 4C are schematic diagrams of an application scenario of a display control method according to an embodiment.

It should be noted that there may be a plurality of scenarios in which the mobile phone 100 plays the page flip animation. This is not limited in the embodiments. A home screen (home screen) is used as an example. As shown in FIG. 4A, the home screen may be divided into a plurality of sub-screens (sub-screen). When it is detected that the user's finger swipes on a sub-screen of the home screen, a page flip animation may be played to switch to another sub-screen of the home screen. Alternatively, as shown in FIG. 4B, when the terminal displays an application screen of an APP, if it is detected that the user's finger swipes on the application screen, a page flip animation may be played to switch to an upper-level menu or a lower-level menu of the application screen. Alternatively, as shown in FIG. 4C, when the terminal displays a file such as an image, a video, or a document, if it is detected that the user's finger swipes on a current screen, a page flip animation may also be played to switch to a previous file or a next file. Certainly, the user may enable or disable the page flip animation by using a related setting option. This is not limited in the embodiments.

The mobile phone 100 may further include the Bluetooth apparatus 105, configured to exchange data between the mobile phone 100 and another short-range terminal (for example, a mobile phone or a smart watch). In the embodiments of this application, the Bluetooth apparatus may be an integrated circuit, a Bluetooth chip, or the like.

The mobile phone 100 may further include at least one type of sensor 106, such as a light sensor, a motion sensor, or another sensor. Specifically, the optical sensor may include an ambient light sensor and a proximity sensor. The ambient light sensor may adjust luminance of the display of the touchscreen 104 based on brightness of ambient light, and the proximity sensor may power off the display when the mobile phone 100 moves to an ear. As one type of the motion sensor, an accelerometer sensor may detect acceleration values in various directions (usually on three axes). The accelerometer sensor may detect a value and a direction of gravity when the accelerometer sensor is stationary, and may be applied to an application for recognizing a mobile phone posture (such as switching between a landscape screen and a vertical screen, a related game, and magnetometer posture calibration), a function related to vibration recognition (such as a pedometer and a knock), and the like. Other sensors such as a fingerprint sensor, a gyroscope, a barometer, a hygrometer, a thermometer, and an infrared sensor may be further configured on the mobile phone 100. Details are not described herein.

The Wi-Fi apparatus 107 is configured to provide the mobile phone 100 with network access that complies with a Wi-Fi-related standard or protocol. The mobile phone 100 may access a Wi-Fi access point by using the Wi-Fi apparatus 107, to help the user send and receive an email, browse a web page, access streaming media, and the like. The Wi-Fi apparatus 107 provides wireless broadband interne access for the user. In some other embodiments, the Wi-Fi apparatus 107 may be used as a Wi-Fi wireless access point, and may provide Wi-Fi network access for another terminal.

The positioning apparatus 108 is configured to provide a geographic location for the mobile phone 100. It can be understood that the positioning apparatus 108 may be specifically a receiver of a positioning system, such as a global positioning system (global positioning system, GPS) or a BeiDou navigation satellite system. After receiving the geographic location sent by the positioning system, the positioning apparatus 108 sends the information to the processor 101 for processing, or sends the information to the memory 103 for storage. In some other embodiments, the positioning apparatus 108 may be a receiver of an assisted global positioning system (assisted global positioning system, AGPS). The AGPS runs in a manner in which GPS positioning is performed with specific assistance. By using a signal of a base station together with a GPS satellite signal, the AGPS can enable a positioning speed of the mobile phone 100 to be higher. In the AGPS system, the positioning apparatus 108 may obtain positioning assistance through communication with an assisted positioning server (for example, a mobile phone positioning server). The AGPS system is used as an assisted server to assist the positioning apparatus 108 in completing ranging and positioning services. In this case, the assisted positioning server provides positioning assistance by communicating with a terminal such as the positioning apparatus 108 (a GPS receiver) of the mobile phone 100 by using a wireless communications network.

The audio circuit 109, a loudspeaker 113, and a microphone 114 may provide an audio interface between the user and the mobile phone 100. The audio circuit 109 may transmit, to the loudspeaker 113, an electrical signal converted from received audio data, and the loudspeaker 113 converts the electrical signal into a sound signal for output. In addition, the microphone 114 converts a collected sound signal into an electrical signal. The audio circuit 109 receives the electrical signal, converts the electrical signal into audio data, and then outputs the audio data to the RF circuit 102, to send the audio data to, for example, another mobile phone, or outputs the audio data to the memory 103 for further processing.

The peripheral interface 110 is configured to provide various interfaces for an external input/output device (for example, a keyboard, a mouse, a display externally connected to the mobile phone 100, an external memory, or a subscriber identity module card). For example, the mobile phone 100 is connected to the mouse by using a universal serial bus interface, and is electrically connected, by using a metal contact on a card slot of the subscriber identity module card, to the subscriber identity module (subscriber identity module, SIM) card provided by a telecommunications operator. The peripheral interface 110 may be configured to couple the external input/output peripheral device to the processor 101 and the memory 103.

The mobile phone 100 may further include the power apparatus 111 (for example, a battery and a power management chip) that supplies power to the components. The battery may be logically connected to the processor 101 by using the power management chip, so that functions such as charging management, discharging management, and power consumption management are implemented by using the power apparatus 111.

Although not shown in FIG. 3, the mobile phone 100 may further include a camera, a flash, a micro projection apparatus, a near field communication (near field communication, NFC) apparatus, and the like. Details are not described herein.

For ease of understanding, the following specifically describes, with reference to the accompanying drawings, the display control method according to the embodiments of this application.

Figure 5:
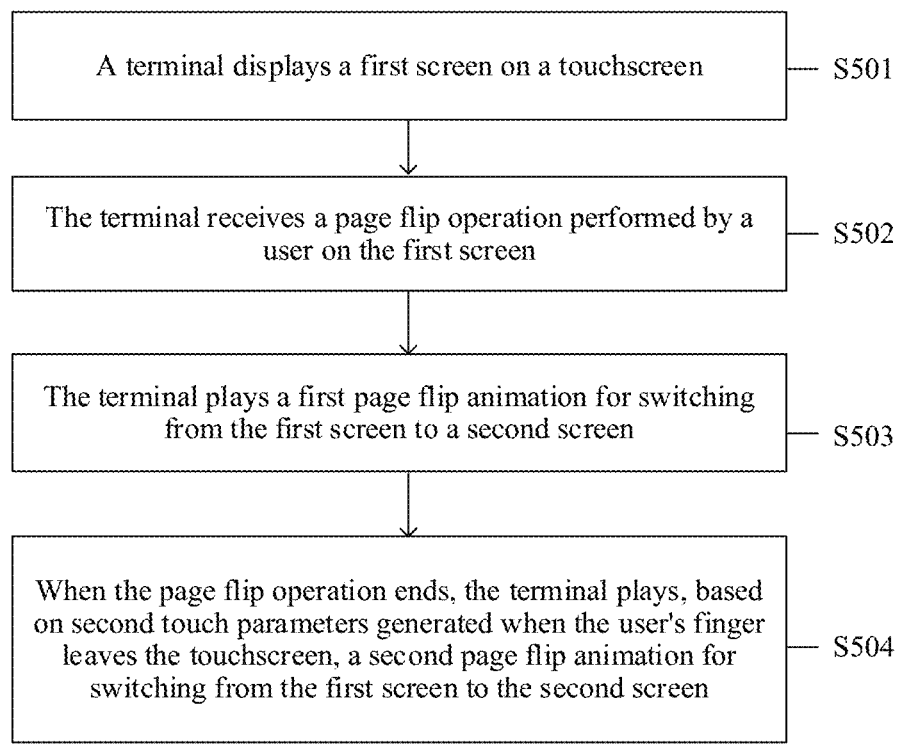
FIG. 5 is a schematic flowchart of a display control method according to an embodiment of this application.

FIG. 5 is a schematic flowchart of a display control method according to an embodiment of this application. As shown in FIG. 5, the display control method may include the following steps.

S501: A terminal displays a first screen on a touchscreen.

The first screen may be any screen that supports display of a page flip animation. For example, the first screen may be a sub-screen of a home screen. Alternatively, the first screen may be a play screen of a picture or a document. Alternatively, the first screen may be any application (APP) screen that has an upper-level menu or a lower-level menu. This is not limited in this embodiment of this application.

S502: The terminal receives a page flip operation performed by a user on the first screen.

The page flip operation may be a swiping operation performed by the user on the first screen by using a finger, or may be a swiping operation performed by the user on the first screen by using a device such as a stylus. This is not limited in this embodiment of this application.

Figure 6:
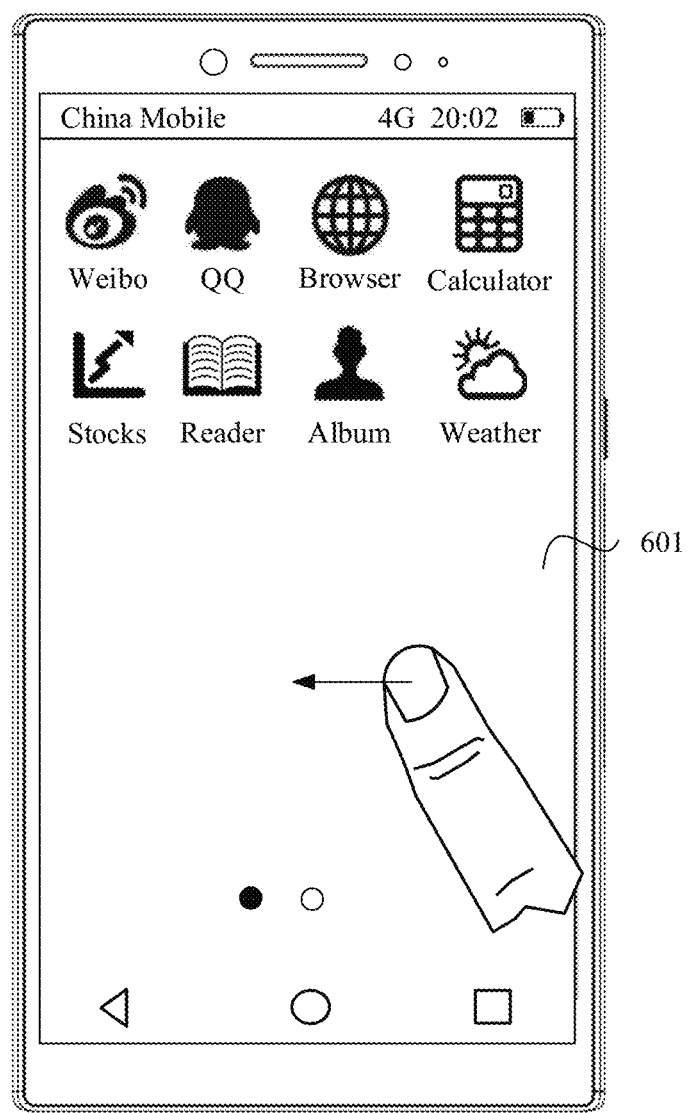
FIG. 6 is a schematic diagram 2 of an application scenario of a display control method according to an embodiment of this application.

Specifically, when the terminal displays the first screen, the touchscreen may detect an input of the user on the first screen in real time. For example, the page flip operation is the swiping operation performed by the user on the first screen by using the finger. As shown in FIG. 6, a first screen 601 is a sub-screen of a home screen. After the touchscreen detects that the user's finger touches the touchscreen, the touchscreen may generate a series of touch events based on information such as coordinates and a touch moment of each detected touch point, and report the series of touch events to a processor of the terminal. The processor may determine, based on the touch events, that a current operation performed by the user is the page flip operation, and then the processor may control, according to the following steps S503 to S504, the touchscreen to display a page flip animation corresponding to the page flip operation.

S503: In response to the page flip operation, the terminal plays a first page flip animation for switching from the first screen to a second screen.

Animation play parameters of the first page flip animation are related to first touch parameters generated when the user's finger swipes on the touchscreen. For example, animation play parameters may include play duration (T) of an animation and a page flip speed (v1) of the animation. The first touch parameters may include a swipe distance and a swipe speed of the user's finger on the touchscreen.

In response to continuous swiping detected by the touchscreen during the page flip operation, when playing the first page flip animation, the terminal may specify that the play duration (T) and the page flip speed (v1) of the animation are in a positive correlation relationship with the swipe distance and the swipe speed of the user's finger on the touchscreen. For example, it may be specified that the page flip speed (v1) of the first page flip animation is the same as the swipe speed of the user's finger on the touchscreen, and the play duration (T) of the first page flip animation is the same as duration in which the user's finger stays on the touchscreen.

Figure 7A:
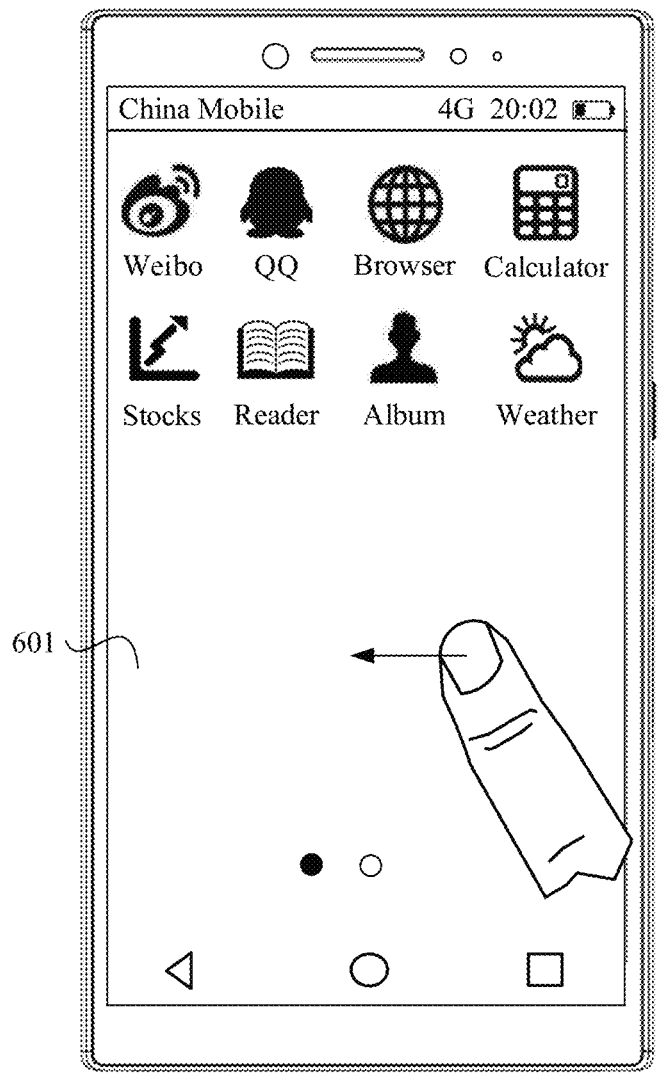
FIG. 7A to FIG. 7C are a schematic diagram 3 of an application scenario of a display control method according to an embodiment of this application.
Figure 7B:
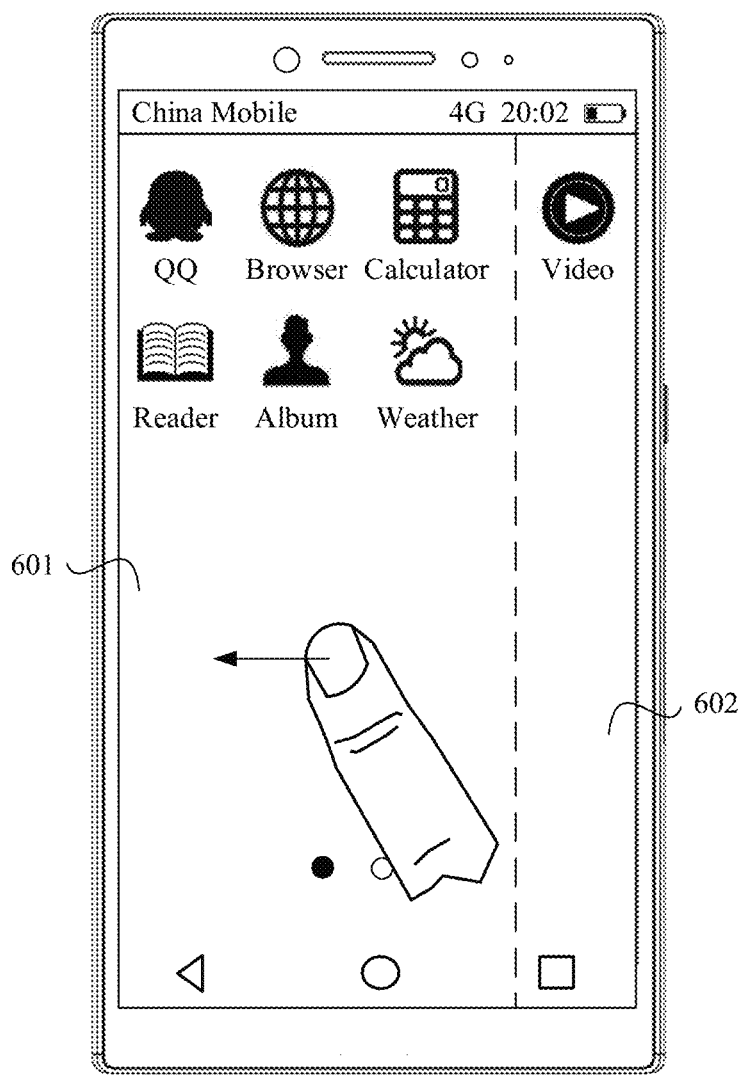
Figures 7B, 7C:
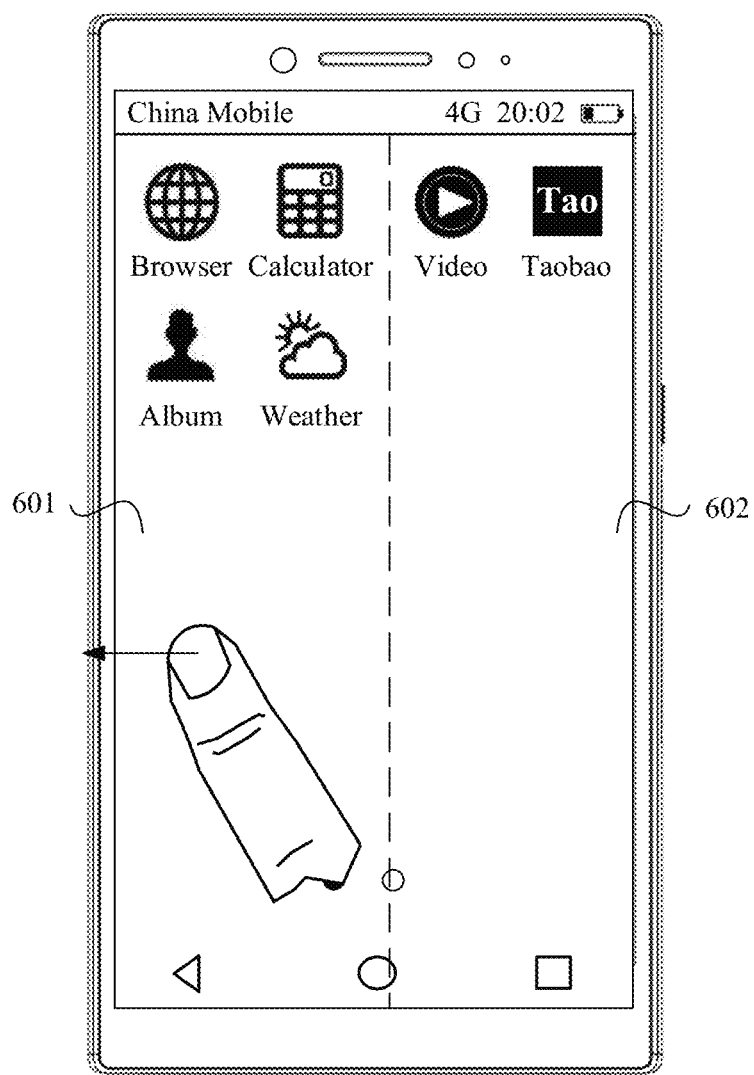

In other words, in a process in which the user's finger swipes on the first screen (that is, in a hand-touching phase), as shown in FIG. 7A to FIG. 7C, the first screen 601 may move in a swiping direction of the user's finger and by using the swipe speed of the user's finger as the page flip speed (v1) of the first page flip animation, and a second screen 602 adjacent to the first screen 601 is gradually displayed. That is, a "hand-touching" animation effect is implemented during page flip.

S504: When the page flip operation ends, the terminal plays, based on second touch parameters generated when the user's finger leaves the touchscreen, a second page flip animation for switching from the first screen to the second screen until the terminal displays the complete second screen.

The second touch parameters include a swipe distance (s) and a swipe speed (v2) that are generated when the user's finger leaves the touchscreen.

In other words, animation play parameters of the second page flip animation are related to the swipe distance (s) and the swipe speed (v2) that are generated when the user's finger leaves the touchscreen. In a "hand-leaving phase" after the user's finger leaves the touchscreen, the second page flip animation played by the terminal dynamically changes based on the second touch parameters that are actually generated when the user's finger leaves the touchscreen. In this way, the terminal can play, in different page flip scenarios, a page flip animation that matches an actual touch scenario of the user.

Still in the example in which animation play parameters include play duration (T) of an animation and a page flip speed (v1) of the animation, when the terminal detects that a continuous swiping process in which the user performs the page flip operation ends, for example, when the user's finger swipes for a distance and then leaves the touchscreen, the terminal may calculate the swipe distance (s) and the swipe speed (v2) that are generated when the user's finger leaves the touchscreen. If the swipe distance (s) generated when the user's finger leaves the touchscreen is greater than a distance threshold, or if the swipe speed (v2) generated when the user's finger leaves the touchscreen is greater than a speed threshold, it indicates that the user swipes on the touchscreen and intends to switch from the first screen to the second screen. Therefore, when the swipe distance (s) generated when the user's finger leaves the touchscreen is greater than the distance threshold, or when the swipe speed (v2) generated when the user's finger leaves the touchscreen is greater than the speed threshold, the terminal may play the second page flip animation for switching from the first screen to the second screen, that is, a page flip animation in the hand-leaving phase.

For example, the terminal may obtain a series of touch events that are reported by the touchscreen and that are generated when the user's finger swipes on the first screen, and each touch event may include coordinates and a touch moment of a corresponding touch point. Further, the terminal may calculate, based on the coordinates of the touch points in the series of touch events, the swipe distance (s) that has been generated when the user's finger leaves the touchscreen. In addition, the terminal may further calculate, based on coordinates and touch moments of N latest touch points (for example, 20 latest touch points) in the series of touch events, the swipe speed (v2) generated when the user's finger leaves the touchscreen.

In addition, when calculating the swipe speed (v2) generated when the user's finger leaves the touchscreen, the terminal may further convert a unit of the swipe speed (v2) into px/s (pixels per second). This facilitates subsequent calculation of the animation play parameters for playing the second page flip animation. For example, the terminal may calculate, based on the coordinates of the N touch points, a distance for which the user's finger swipes within a relatively short time before leaving the touchscreen. For example, the distance is 0.8 cm. In addition, the terminal may calculate, based on the touch moments of the N touch points, a time spent on swiping 0.8 cm. For example, the time is 200 ms. The terminal may calculate that the swipe speed v2 generated when the user's finger leaves the touchscreen is 0.8 cm/200 ms, that is, 4 cm/s. Further, the terminal may further calculate, based on a PPI (Pixels Per Inch, a quantity of pixels per inch) of the touchscreen, a quantity of pixels passed through per second when the user's finger leaves the touchscreen at the speed of 4 cm/s. For example, if the quantity of pixels passed through per second is 750, v2=750 px/s.

In this embodiment of this application, when the swipe distance (s) generated when the user's finger leaves the touchscreen is greater than the distance threshold, the terminal may calculate the animation play parameters of the second page flip animation based on a first preset relationship. When the swipe speed (v2) generated when the user's finger leaves the touchscreen is greater than the speed threshold, the terminal may calculate the animation play parameters of the second page flip animation based on a second preset relationship. When the swipe distance (s) is greater than the distance threshold, the swipe speed of the user's finger is usually low, and when the swipe speed (v2) is greater than the speed threshold, the swipe speed of the user's finger is usually high. Therefore, in this embodiment of this application, different animation play parameter calculation methods are set for a page flip scenario in which the user quickly swipes on the first screen to trigger a page flip animation and a page flip scenario in which the user slowly swipes on the first screen to trigger a page flip animation, so that the user can obtain matched second page flip animation effects in both the low-speed page flip scenario and the high-speed page flip scenario.

It should be noted that a person skilled in the art may set the distance threshold and the speed threshold based on actual experience or an actual application scenario. This is not limited in this embodiment of this application. For example, the speed threshold may be set to 600 px/s. For another example, if a total displacement of the entire page flip animation for switching from the first screen to the second screen is a width D (screen_width) of the touchscreen in a horizontal direction, the distance threshold may be set to 40% of the width D. Certainly, the total displacement of the entire page flip animation may alternatively be a length of the touchscreen in a vertical direction or any other direction. This is not limited in this embodiment of this application.

The following embodiment is described by using an example in which when the swipe distance (s) generated when the user's finger leaves the touchscreen is greater than the distance threshold, the terminal is triggered to play the second page flip animation.

Similar to the animation play parameters of the first page flip animation, the animation play parameters of the second page flip animation may also include play duration (T) of the animation and a page flip speed (v1) of the animation.

During determining of the page flip speed (v1) of the second page flip animation, because a speed of the user's finger is usually relatively low when the swipe distance (s) is greater than the distance threshold, it may be approximately considered that the page flip speed (v1) of the second page flip animation is fixed. A parameter that affects the page flip speed (v1) is usually an interpolator parameter of an interpolator. For example, the interpolator parameter may be coordinates of the points P0 to P3 on the Bézier curve in FIG. 2. P0 (0, 0) and P3 (1, 1) are usually fixed as a start point and an end point of the second page flip animation. Therefore, coordinates of control points P1 and P2 on the Bézier curve may be set to fixed values, so that the terminal plays the second page flip animation at the fixed page flip speed (v1).

For example, the coordinates of the point P1 may be set to (0.3, 0) and the coordinates of the point P2 may be set to (0.2, 1).

When determining the play duration (T) of the second page flip animation, the terminal may calculate the play duration (T) based on a preset first function relationship and the swipe distance (s) generated when the user's finger leaves the touchscreen. As shown in FIG. 8, in the first function relationship, the play duration (T) is inversely proportional to the swipe distance (s). To be specific, a longer swipe distance (s) generated when the user's finger leaves the touchscreen indicates shorter play duration (T) for playing the second page flip animation. Correspondingly, a shorter swipe distance (s) generated when the user's finger leaves the touchscreen indicates longer play duration (T) for playing the second page flip animation. In this way, in the low-speed page flip scenario, the terminal may present, to the user based on the swipe distance (s) generated when the user's finger leaves the touchscreen, second page flip animations in different play duration (T), thereby improving smoothness of page flip animations.

For example, the first function relationship is $T=k1+(1-c)/(1-40\%)\times k2$, where c is a displacement completion rate generated when the finger leaves the touchscreen, to be specific, c=swipe distance (s)/total displacement D for completing the entire page flip animation, and 40% is a displacement completion rate corresponding to the distance threshold; and k1 and k2 are preset constant values (0<k1<1, and 0<k2<1), k1 is used to determine a minimum value of the play duration (T), and k2 is used to determine a maximum value of the play duration (T).

For example, when the play duration (T) is in a unit of second (s), k1=0.26 and k2=0.06 may be set. In this case, the first function relationship is $T=0.26+(1-c)/(1-40\%)\times 0.06$. That is, the play duration (T) of the second page flip animation ranges from 260 ms to 320 ms.

It may be understood that a person skilled in the art sets the first function relationship and values of k1 and k2 based on actual experience or an actual application scenario. This is not limited in this embodiment of this application.

In this way, after determining the page flip speed (v1) of the second page flip animation and the play duration (T) of the second page flip animation by using the foregoing method, the terminal may play the second page flip animation based on the group of animation play parameters (which may be referred to as first animation play parameters in this embodiment of this application). In this way, in the low-speed page flip scenario, the terminal can present the second page flip animation that matches the swipe distance (s) generated when the user's finger leaves the touchscreen.

The following embodiment is described by using an example in which when the swipe speed (v2) generated when the user's finger leaves the touchscreen is greater than the speed threshold, the terminal is triggered to play the second page flip animation.

Similar to the animation play parameters of the first page flip animation, the animation play parameters of the second page flip animation may also include play duration (T) of the animation and a page flip speed (v1) of the animation.

During determining of the play duration (T) of the second page flip animation, because a speed of the user's finger is relatively high when the swipe speed (v2) is greater than the speed threshold, the play duration (T) of the second page flip animation is related to the swipe distance (s) generated when the user's finger leaves the touchscreen, and is also related to the swipe speed (v2) generated when the user's finger leaves the touchscreen. In this case, the terminal may calculate the play duration (T) based on a preset second function relationship. In the second function relationship, as shown in FIG. 9(a), the play duration (T) is inversely proportional to the swipe distance (s). In addition, as shown in FIG. 9(b), the play duration (T) is also inversely proportional to the swipe speed (v2).

To be specific, a higher swipe speed (v2) and a longer swipe distance (s) that are generated when the user's finger leaves the touchscreen indicates shorter play duration (T) for playing the second page flip animation. Correspondingly, a lower swipe speed (v2) and a shorter swipe distance (s) that are generated when the user's finger leaves the touchscreen indicates longer play duration (T) for playing the second page flip animation. In this way, in the low-speed page flip scenario, the terminal may present, to the user based on the swipe distance (s) and the swipe speed (v2) that are generated when the user's finger leaves the touchscreen, second page flip animations in different play duration (T), thereby improving smoothness of page flip animations.

For example, the second function relationship is $$T = w1 + w2 \times (1-c) + w3 \times \left(1 - \frac{v2 - w4}{w5 - w4}\right),$$

where c is a displacement completion rate generated when the user's finger leaves the touchscreen, to be specific, c=swipe distance (s)/total displacement D for completing the entire page flip animation; w4 is a speed threshold that is satisfied when the user's finger leaves the touchscreen, and w5 is a maximum swipe speed generated when the user's finger leaves the touchscreen; and w1, w2, and w3 are preset constant values (0<w1<1, 0<w2<1, 0<w3<1), a minimum value of the play duration (T) is determined based on w1, and a maximum value of the play duration (T) is determined based on both w2 and w3.

For example, when the play duration (T) is in a unit of second (s), w1=0.24, w2=0.05, and w3=0.06 may be set. Generally, the speed threshold that is satisfied when the user's finger leaves the touchscreen may be set to 1.5 times of the PPI of the touchscreen, that is, w4=1.5 PPI. The maximum swipe speed generated when the user's finger leaves the touchscreen is about 50 times of the PPI of the touchscreen, that is, w5=50 PPI.

In this case, the second function relationship is $$T = 0.24 + 0.05 \times (1-c) + 0.06 \times \left(1 - \frac{v2 - 1.5PPI}{50PPI - 1.5PPI}\right).$$

It may be understood that a person skilled in the art sets the second function relationship and specific values of w1, w2, w3, w4, and w2 based on actual experience or an actual application scenario. This is not limited in this embodiment of this application.

During determining of the page flip speed (v1) of the second page flip animation, the page flip speed (v1) of the second page flip animation may be determined based on the coordinates of the two control points P1 and P2 on the Bézier curve. The coordinates of the point P1 mainly affect a progress on which play of the second page flip animation starts, and the coordinates of the point P2 mainly affect a progress on which play of the second page flip animation ends. However, regardless of a page flip scenario, the progress on which the play of the second page flip animation ends is basically the same. Therefore, the coordinates of the point P2 may be set to fixed values. For example, the coordinates of P2 are set to (0.25, 1).

It is assumed that the coordinates of the point P1 are (a, b), a value of a mainly affects a location of a speed peak during the play of the second page flip animation. A smaller value of a indicates an earlier speed peak during the play of the second page flip animation, namely, a less obvious acceleration process of the second page flip animation after the user's finger leaves the touchscreen. A larger value of a indicates a later speed peak during the play of the second page flip animation, namely, a more obvious acceleration process of the second page flip animation after the user's finger leaves the touchscreen.

In some embodiments of this application, when determining the horizontal coordinate a of the point P1, the terminal may calculate the horizontal coordinate a based on a preset third function relationship and the swipe speed (v2) generated when the user's finger leaves the touchscreen. The value of the horizontal coordinate a is directly proportional to the swipe speed (v2).

Figure 10A:
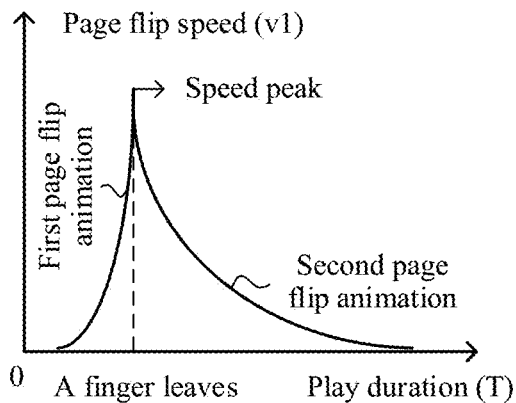
FIG. 10(a) and FIG. 10(b) are a schematic principle diagram 3 of a display control method according to an embodiment of this application.
Figure 10B:
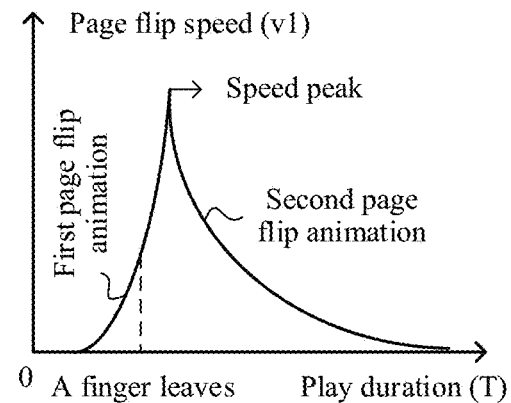

To be specific, as shown in FIG. 10(a), a higher swipe speed (v2) generated when the user's finger leaves the touchscreen indicates an earlier speed peak location of the second page flip animation. In this way, when the user quickly swipes on the first screen, there is no obvious acceleration process for the second page flip animation, and the page flip speed may be gradually reduced to 0 when the second page flip animation ends. However, as shown in FIG. 10(b), a lower swipe speed (v2) generated when the user's finger leaves the touchscreen indicates a later speed peak location of the second page flip animation. In this way, when the user swipes on the first screen at a slightly slow speed (the slightly slow speed is greater than the speed threshold), the second page flip animation may present a process of acceleration before deceleration. In this way, in the play duration (T) of the second page flip animation, regardless of a speed at which the user swipes on the first screen, an entire swiping process perceived by the user has only one speed peak, so that the page flip animations are more smooth and natural as a whole.

For example, the third function relationship is:

$$a = n1 \times \left(1 - \frac{v2 - w4}{w5 - w4}\right),$$

where w4 is a speed threshold that is satisfied when the user's finger leaves the touchscreen, w5 is a maximum swipe speed generated when the user's finger leaves the touchscreen, and n1 is a preset constant value (0<n1<1).

For example, when n1=0.3, w4=1.5 PPI, and w5=60 PPI, the third function relationship is:

$$a = 0.3 \times \left(1 - \frac{v2 - 1.5PPI}{60PPI - 1.5PPI}\right).$$

Still in an example in which the coordinates of the point P1 are (a, b), a value of b mainly affects an initial speed during the play of the second page flip animation. When the initial speed of the second page flip animation is closer to the swipe speed (v2) generated when the user's finger leaves the touchscreen, the animation playing process perceived by the user is more natural and smooth.

In some other embodiments of this application, when determining the vertical coordinate b of the point P1, the terminal may calculate the vertical coordinate b based on a preset fourth function relationship and the swipe speed (v2) and the swipe distance (s) that are generated when the user's finger leaves the touchscreen. For example, the fourth function relationship is:

$$b = \frac{v2 \times a \times T}{2 \times (1-c) \times D},$$

where c is a displacement completion rate generated when the user's finger leaves the touchscreen, to be specific, c=swipe distance (s)/total displacement D for completing the entire page flip animation; T is the play duration of the second page flip animation calculated by using the second function relationship; a is the horizontal coordinate of the point P1 calculated by using the third function relationship; and D is the total displacement for completing the entire page flip animation.

It can be learned from the second function relationship to the fourth function relationship that, when the swipe speed (v2) generated when the user's finger leaves the touchscreen is greater than the speed threshold, if the user's finger swipes on the touchscreen for a relatively long distance and at a relatively high speed, the terminal plays the second page flip animation at a monotonically decreased page flip speed and for very short play duration (for example, T1). If the user's finger swipes on the touchscreen for a relatively short distance but at a relatively high speed, the terminal plays the second page flip animation still at a monotonically decreased page flip speed but for a slightly prolonged play duration (for example, T2) (that is, T2>T1). If the user's finger swipes on the touchscreen for a relatively long distance and at a relatively low speed, the terminal plays the second page flip animation at a page flip speed of slight acceleration before deceleration and for relatively long play duration (for example, T3) (that is, T3>T2). If the user's finger swipes on the touchscreen for a relatively short distance and at a relatively low speed, the terminal plays the second page flip animation at a page flip speed of great acceleration before deceleration and for longest play duration (for example, T4) (that is, T4>T3).

In this way, after determining the play duration (T) of the second page flip animation and the coordinates of the points P1 and P2 of the page flip speed (v1) of the second page flip animation, the terminal may play the second page flip animation based on the group of animation play parameters (which may be referred to as second animation play parameters in this embodiment of this application), so that the terminal can present, in the high-speed page flip scenario, the second page flip animation that matches the swipe distance (s) and the swipe speed (v2) that are generated when the user's finger leaves the touchscreen, to improve smoothness of the page flip animations.

Figure 11:
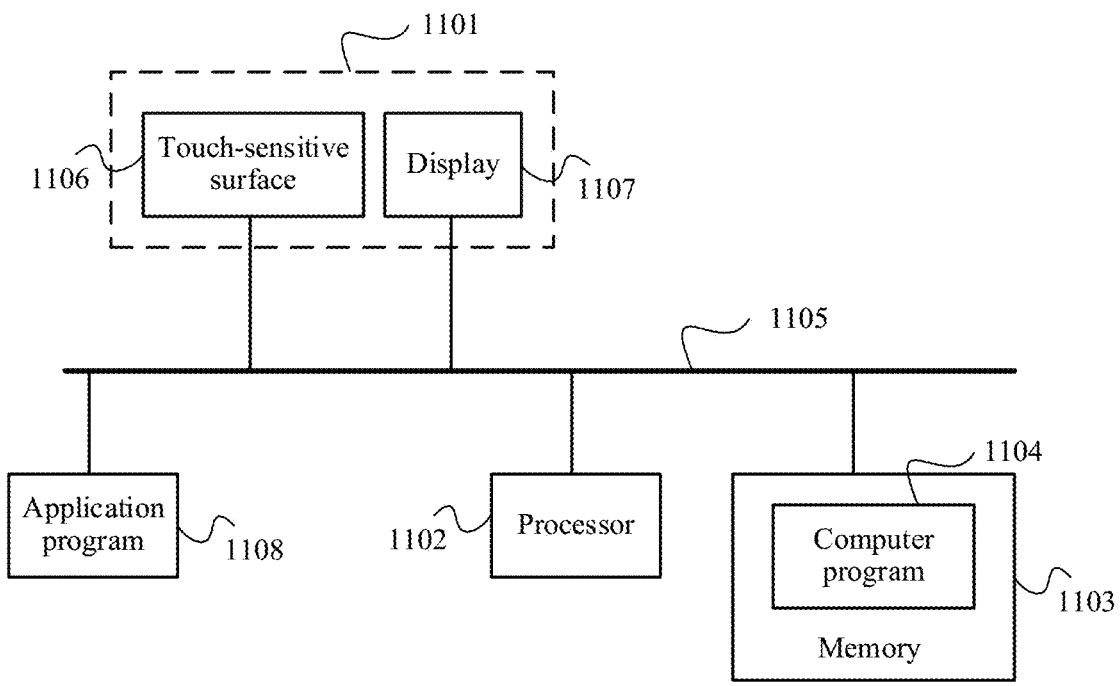
FIG. 11 is a schematic structural diagram 2 of a terminal according to an embodiment of this application.

As shown in FIG. 11, some other embodiments of this application disclose a terminal. The terminal may include a touchscreen 1101, one or more processors 1102, a memory 1103, a plurality of application programs 1108, and one or more computer programs 1104. The touchscreen 1101 includes a touch-sensitive surface 1106 and a display 1107. The foregoing components may be connected by using one or more communications buses 1105. The one or more computer programs 1104 are stored in the memory 1103 and are configured to be executed by the one or more processors 1102. The one or more computer programs 1104 include an instruction, and the instruction may be used to perform the steps in the corresponding embodiment in FIG. 5.

The foregoing descriptions about implementations allow a person skilled in the art to understand that, for the purpose of convenient and brief description, division into the foregoing function modules is taken as an example for illustration. In actual application, the foregoing functions can be allocated to different modules and implemented according to a requirement, that is, an inner structure of an apparatus is divided into different function modules to implement all or some of the functions described above. For a detailed working process of the foregoing system, apparatus, and unit, refer to a corresponding process in the foregoing method embodiments. Details are not described herein again.

Function units in the embodiments of this application may be integrated into one processing unit, or each of the units may exist alone physically, or two or more units are integrated into one unit. The integrated unit may be implemented in a form of hardware, or may be implemented in a form of a software function unit.

When the integrated unit is implemented in the form of a software function unit and sold or used as an independent product, the integrated unit may be stored in a computer-readable storage medium. Based on such an understanding, the technical solutions of the embodiments of this application essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of this application. The foregoing storage medium includes: any medium that can store program code, such as a flash memory, a removable hard disk, a read-only memory, a random access memory, a magnetic disk, or an optical disc.

The foregoing descriptions are merely specific implementations of the embodiments of this application, but are not intended to limit the protection scope of the embodiments of this application. Any variation or replacement within the technical scope disclosed in the embodiments of this application shall fall within the protection scope of the embodiments of this application. Therefore, the protection scope of the embodiments of this application shall be subject to the protection scope of the claims.

What is claimed is:

1. A display control method implemented by a terminal, wherein the display control method comprises:
   displaying a first screen on a touchscreen;
   receiving on the first screen, a page flip operation from a user;
   obtaining, based on a user finger touching the touchscreen during the page flip operation, first touch parameters;
   playing, in response to the page flip operation, a first page flip animation for switching from the first screen to a second screen, wherein the first page flip animation implements first animation play parameters, and wherein the first animation play parameters are based on the first touch parameters;
   obtaining, based on the finger leaving the touchscreen, second touch parameters when the page flip operation ends, wherein the second touch parameters comprise a swipe distance and a swipe speed;

determining second animation play parameters comprising:
- determining, based on a first preset relationship, second animation play parameters when the swipe distance is greater than a preset distance threshold;
- calculating a play duration based on a first function relationship, wherein, in the first function relationship, the play duration is inversely proportional to the swipe distance;
- determining, based on a second preset relationship, second animation play parameters-when the swipe speed is greater than a preset speed threshold; and
- setting coordinates of a control point on a mathematical curve to a preset value, wherein the coordinates of the control point enable the terminal to determine the page flip speed; and playing, a second page flip animation for switching from the first screen to the second screen, wherein the second page flip animation implements the second animation play parameters.

2. The display control method of claim 1, wherein the preset distance threshold is x % of a total displacement D of the page flip animations, and wherein the first function relationship is:

$$T = k1 + (1-c)/(1-x\%) \times k2,$$

wherein T is the play duration, wherein c is a displacement completion rate generated when the user finger leaves the touchscreen, wherein c=the swipe distance divided by the total displacement D, wherein k1 and k2 are preset constant values, wherein 0<k1<1, wherein 0<k2<1, and wherein x is a natural number.

3. The display control method of claim 1, further comprising calculating the play duration based on a second function relationship, wherein, in the second function relationship, the play duration is inversely proportional to both the swipe distance and the swipe speed.

4. The display control method of claim 3, wherein the preset speed threshold is w4, wherein a maximum swipe speed when the user finger leaves the touchscreen is w5, and wherein the second function relationship is:

$$T = w1 + w2[[x]] \times (1-c) + w3[[x]] \times \left(1 - \frac{v2 - w4}{w5 - w4}\right),$$

wherein T is the play duration, wherein v2 is the swipe speed, wherein c is a displacement completion rate generated when the user finger leaves the touchscreen, wherein c=the swipe distance divided by a total displacement D, wherein w1, w2, and w3 are preset constant values, wherein 0<w1<1, wherein 0<w2<1, and wherein 0<w3<1.

5. The display control method of claim 1, further comprising:
- determining the page flip speed based on coordinates of a control point on a Bézier curve;
- calculating a horizontal coordinate of the control point based on a third function relationship, wherein the horizontal coordinate enables the terminal to determine a location of a speed peak during a play of the second page flip animation; and
- calculating a vertical coordinate of the control point based on a fourth function relationship, wherein the vertical coordinate enables the terminal to determine an initial speed during the play of the second page flip animation.

6. The display control method of claim 5, wherein the preset speed threshold is w4, wherein a maximum swipe speed when the user finger leaves the touchscreen is w5, wherein the play duration is T, wherein a total displacement of the page flip animations is D, wherein the third function relationship is $$a = n1 \times \left(1 - \frac{v2 - w4}{w5 - w4}\right),$$

wherein the fourth function relationship is $$b = \frac{v2 \times a \times T}{2 \times (1-c) \times D},$$

wherein a is the horizontal coordinate, wherein b is the vertical coordinate, wherein v2 is the swipe speed, wherein c is a displacement completion rate generated when the user finger leaves the touchscreen, wherein c=the swipe distance divided by the total displacement D, wherein n1 is a preset constant value, and wherein 0<n1<1.

7. A terminal comprising:
a touchscreen; and
a processor coupled to the touchscreen and configured to:
- display a first screen on the touchscreen;
- receive on the first screen, a page flip operation from a user;
- obtain, based on a user finger touching the touchscreen during the page flip operation, first touch parameters;
- play, in response to the page flip operation, a first page flip animation for switching from the first screen to a second screen, wherein the first page flip animation implements first animation play parameters, and wherein the first animation play parameters are based on the first touch parameters;
- obtain, based on the finger leaving the touchscreen, second touch parameters when the page flip operation ends, wherein the second touch parameters comprise a swipe distance and a swipe speed;

wherein the processor is further configured to determine second animation play parameters by executing instructions to:
- determine, based on a first preset relationship, second animation play parameters when the swipe distance is greater than a preset distance threshold;
- calculate a play duration based on a first function relationship, wherein, in the first function relationship, the play duration is inversely proportional to the swipe distance;
- determine, based on a second preset relationship, second animation play parameters-when the swipe speed is greater than a preset speed threshold; and
- set coordinates of a control point on a mathematical curve to a preset value, wherein the coordinates of the control point enable the terminal to determine the page flip speed; and play, when the page flip operation ends, a second page flip animation for switching from the first screen to the second screen, wherein the second page flip animation implements second animation play parameters.

8. The terminal of claim 7, wherein the preset distance threshold is x % of a total displacement D of the page flip animations, and wherein the first function relationship is:

$$T = k1 + (1-c)/(1-x\%) \times k2,$$

wherein T is the play duration, wherein c is a displacement completion rate generated when the user finger leaves the touchscreen, wherein c=the swipe distance divided by the total displacement D, wherein k1 and k2 are preset constant values, wherein 0<k1<1, wherein 0<k2<1, and wherein x is a natural number.

9. The terminal of claim 7, wherein the processor is further configured to:
calculate the play duration based on a second function relationship, wherein, in the second function relationship, the play duration is inversely proportional to both the swipe distance and the swipe speed.

10. The terminal of claim 9, wherein the preset speed threshold is w4, wherein a maximum swipe speed generated when the user finger leaves the touchscreen is w5, and wherein the second function relationship is:

$$T = w1 + w2[[x]] \times (1-c) + w3[[x]] \times \left(1 - \frac{v2 - w4}{w5 - w4}\right),$$

wherein T is the play duration, wherein v2 is the swipe speed, wherein c is a displacement completion rate generated when the user finger leaves the touchscreen, wherein c=the swipe distance divided by a total displacement D, wherein w1, w2, and w3 are preset constant values, wherein 0<w1<1, wherein 0<w2<1, and wherein 0<w3<1.

11. The terminal of claim 7, wherein the processor is further configured to:
determine the page flip speed based on coordinates of a control point on a mathematical curve;
calculate a horizontal coordinate of the control point based on a third function relationship, wherein the horizontal coordinate enables the terminal to determine a location of a speed peak during a play of the second page flip animation; and
calculate a vertical coordinate of the control point based on a fourth function relationship, wherein the vertical coordinate enables the terminal to determine an initial speed during the play of the second page flip animation.

12. The terminal of claim 11, wherein the preset speed threshold is w4, wherein a maximum swipe speed generated when the user finger leaves the touchscreen is w5, wherein the play duration is T, wherein a total displacement of the page flip animations is D, wherein the third function relationship is $$a = n1 \times \left(1 - \frac{v2 - w4}{w5 - w4}\right),$$

wherein the fourth function relationship is $$b = \frac{v2 \times a \times T}{2 \times (1-c) \times D},$$

wherein a is the horizontal coordinate, wherein b is the vertical coordinate, wherein v2 is the swipe speed, wherein c is a displacement completion rate generated when the user finger leaves the touchscreen, wherein c=the swipe distance divided by the total displacement D, wherein n1 is a preset constant value, and wherein 0<n1<1.

13. The terminal of claim 11, wherein the preset speed threshold is w4, wherein a maximum swipe speed generated when the user finger leaves the touchscreen is w5, wherein the play duration is T, wherein a total displacement of the page flip animations is D, wherein the third function relationship is $$a = n1 \times \left(1 - \frac{v2 - w4}{w5 - w4}\right),$$

wherein the fourth function relationship is $$b = \frac{v2 \times a \times T}{2 \times (1-c) \times D},$$

wherein a is the horizontal coordinate, wherein b is the vertical coordinate, wherein v2 is the swipe speed, wherein c is a displacement completion rate generated when the user finger leaves the touchscreen, wherein c=the swipe distance divided by the total displacement D, wherein n1 is a preset constant value, and wherein 0<n1<1.

14. The terminal of claim 7, wherein a play duration of the first page flip animation is equal to a touch duration of the user finger on the touchscreen, and wherein a page flip speed of the first page flip animation is equal to a swipe speed of the user finger on the touchscreen.

15. A computer program product comprising computer-executable instructions stored on a non-transitory computer-readable storage medium that, when executed by a processor, cause a terminal to:
display a first screen on a touchscreen;
receive on the first screen, a page flip operation from a user;
obtain, based on a user finger touching the touchscreen during the page flip operation, first touch parameters;
play, in response to the page flip operation, a first page flip animation for switching from the first screen to a second screen, wherein the first page flip animation implements first animation play parameters, and wherein the first animation play parameters are based on the first touch parameters;
obtain, based on the finger leaving the touchscreen, second touch parameters when the page flip operation ends, wherein the second touch parameters comprise a swipe distance and a swipe speed;
wherein the processor is further configured to determine second animation play parameters by executing instructions to:
determine, based on a first preset relationship, second animation play parameters when the swipe distance is greater than a preset distance threshold;
calculate a play duration based on a first function relationship, wherein, in the first function relationship, the play duration is inversely proportional to the swipe distance;
determine, based on a second preset relationship, second animation play parameters-when the swipe speed is greater than a preset speed threshold; and
set coordinates of a control point on a mathematical curve to a preset value, wherein the coordinates of the control point enable the terminal to determine the page flip speed; and play, when the page flip operation ends, a second page flip animation for switching from the first screen to the second screen, wherein the second page flip animation implements second animation play parameters.

16. The computer program product of claim 15, wherein the preset distance threshold is x % of a total displacement D of the page flip animations, and wherein the first function relationship is:

$$T=k1+(1-c)/(1-x\%) \times k2,$$

wherein T is the play duration, wherein c is a displacement completion rate generated when the user finger leaves the touchscreen, wherein c=the swipe distance divided by the total displacement D, wherein k1 and k2 are preset constant values, $0<k1<1$, wherein $0<k2<1$, and wherein x is a natural number.

17. The computer program product of claim 15, wherein the processor is further configured to:
calculate the play duration based on a second function relationship, wherein, in the second function relationship, the play duration is inversely proportional to both the swipe distance and the swipe speed.

18. The computer program product of claim 17, wherein the preset speed threshold is w4, wherein a maximum swipe speed generated when the user finger leaves the touchscreen is w5, and wherein the second function relationship is:

$$T = w1 + w2 \times (1-c) + w3 \times \left(1 - \frac{v2-w4}{w5-w4}\right),$$

wherein T is the play duration, wherein v2 is the swipe speed, wherein c is a displacement completion rate generated when the user finger leaves the touchscreen, wherein c=the swipe distance divided by a total displacement D, wherein w1, w2, and w3 are preset constant values, wherein $0<w1<1$, wherein $0<w2<1$, and wherein $0<w3<1$.

19. The computer program product of claim 15, wherein the processor is further configured to:
determine the page flip speed based on coordinates of a control point on a mathematical curve;
calculate a horizontal coordinate of the control point based on a third function relationship, wherein the horizontal coordinate enables the terminal to determine a location of a speed peak during a play of the second page flip animation; and
calculate a vertical coordinate of the control point based on a fourth function relationship, wherein the vertical coordinate enables the terminal to determine an initial speed during the play of the second page flip animation.

20. The computer program product of claim 15, wherein a play duration of the first page flip animation is equal to a touch duration of the user finger on the touchscreen, and wherein a page flip speed of the first page flip animation is equal to a swipe speed of the user finger on the touchscreen.

\* \* \* \* \*

UNITED STATES PATENT AND TRADEMARK OFFICE
CERTIFICATE OF CORRECTION

PATENT NO. : 11,829,581 B2  
APPLICATION NO. : 17/057458  
DATED : November 28, 2023  
INVENTOR(S) : Lang Song and Quanfei Xu Page 1 of 1

It is certified that error appears in the above-identified patent and that said Letters Patent is hereby corrected as shown below:

In the Claims

Claim 1, Column 21, Line 11: "play parameters-when the" should read "play parameters when the"

Claim 4, Column 21, Line 45: "T = w1+ w2[[x]] × (1 – c) + w3[[x]] × (1" should read "T = w1+ w2 × (1 – c) + w3 × (1"

Claim 7, Column 22, Line 57: "play parameters-when the" should read "play parameters when the"

Claim 10, Column 23, Line 25: "T = w1+ w2[[x]] × (1 – c) + w3[[x]] × (1" should read "T = w1+ w2 × (1 – c) + w3 × (1"

Claim 15, Column 24, Line 62: "play parameters-when the" should read "play parameters when the"

Signed and Sealed this  
Ninth Day of January, 2024

Katherine Kelly Vidal  
*Director of the United States Patent and Trademark Office*